(12) United States Patent
Nakajima et al.

(10) Patent No.: US 10,506,208 B2
(45) Date of Patent: Dec. 10, 2019

(54) IMAGE DISPLAY APPARATUS AND IMAGE DISPLAY METHOD

(71) Applicant: Sony Corporation, Tokyo (JP)

(72) Inventors: Jyunpei Nakajima, Kanagawa (JP); Koji Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/618,645

(22) Filed: Jun. 9, 2017

(65) Prior Publication Data

US 2017/0280118 A1 Sep. 28, 2017

Related U.S. Application Data

(63) Continuation of application No. 14/776,191, filed as application No. PCT/JP2013/007626 on Dec. 26, 2013, now Pat. No. 9,716,869.

(30) Foreign Application Priority Data

Mar. 22, 2013 (JP) ................................. 2013-059748

(51) Int. Cl.
*H04N 9/31* (2006.01)
*G03B 21/20* (2006.01)
(Continued)

(52) U.S. Cl.
CPC ........... *H04N 9/3155* (2013.01); *G02B 5/005* (2013.01); *G02B 5/3083* (2013.01);
(Continued)

(58) Field of Classification Search
CPC ........ G02B 27/28; G02B 5/30; G02B 27/123; G02B 27/48; G02B 5/005; G02B 27/285;
(Continued)

(56) References Cited

U.S. PATENT DOCUMENTS 5,986,809 A 11/1999 Itoh et al.
6,513,953 B1 * 2/2003 Itoh ...................... G02B 3/0062
348/E9.027
(Continued)

FOREIGN PATENT DOCUMENTS

JP 2003-121928 A 4/2003
JP 2004-21209 A 1/2004
(Continued)

OTHER PUBLICATIONS

International Search Report dated Mar. 4, 2014 in PCT/JP2013/007626.

*Primary Examiner* — Cara E Rakowski
*Assistant Examiner* — Danell L Owens
(74) *Attorney, Agent, or Firm* — Oblon, McClelland, Maier & Neustadt, L.L.P.

(57) ABSTRACT

An image display apparatus according to an embodiment of the present technology includes a light source section, one or more reflection type light modulators, an optical system, and a light shielding plate. The light source section includes at least one or more laser light sources. The one or more reflection type light modulators modulate and reflect incident light. The optical system splits light from the light source section into a plurality of split light beams, superimposes the plurality of split light beams on the one or more reflection type light modulators, and causes them to enter. The light shielding plate is provided in the optical system and includes an aperture provided on a path of each of the plurality of split light beams and a light shielding portion that shields reflection light from the reflection type light modulator to the light source section.

11 Claims, 17 Drawing Sheets

(51) Int. Cl.
*G02B 5/30* (2006.01)
*G02B 27/28* (2006.01)
*G02B 5/00* (2006.01)
*G02B 27/12* (2006.01)
*G02B 27/48* (2006.01)
*G03B 21/16* (2006.01)
*G02B 3/00* (2006.01)

(52) U.S. Cl.
CPC ......... *G02B 27/123* (2013.01); *G02B 27/283* (2013.01); *G02B 27/285* (2013.01); *G02B 27/286* (2013.01); *G02B 27/48* (2013.01); *G03B 21/208* (2013.01); *H04N 9/3144* (2013.01); *H04N 9/3161* (2013.01); *H04N 9/3164* (2013.01); *H04N 9/3167* (2013.01); *H04N 9/3197* (2013.01); *G02B 3/0056* (2013.01); *G03B 21/16* (2013.01); *G03B 21/2073* (2013.01)

(58) Field of Classification Search
CPC ....... G02B 27/283; G02B 3/0056; F02B 3/00; H04N 9/31; H04N 5/74; H04N 9/3155; H04N 9/3197; H04N 9/3144; G03B 21/16; G03B 21/14; G03B 21/208; G03B 21/2073
See application file for complete search history.

(56) References Cited

U.S. PATENT DOCUMENTS

| | | | |
|---|---|---|---|
| 2003/0086265 A1 | 5/2003 | Ilsaka et al. | |
| 2004/0239907 A1* | 12/2004 | Hintersteiner | G03F 7/70041 355/67 |
| 2004/0263697 A1* | 12/2004 | Fuse | G02B 27/283 349/5 |
| 2005/0111072 A1 | 5/2005 | Miyagaki | |
| 2006/0012842 A1 | 1/2006 | Abu-Ageel | |
| 2007/0291594 A1 | 12/2007 | Okuyama et al. | |
| 2008/0204847 A1* | 8/2008 | Kamm | G02B 27/48 359/238 |
| 2008/0254645 A1* | 10/2008 | Taniguchi | G03F 7/70125 438/795 |
| 2009/0161077 A1* | 6/2009 | Maeda | G03B 21/005 353/31 |
| 2010/0039621 A1 | 2/2010 | Hayashi et al. | |
| 2011/0181801 A1 | 7/2011 | Okumura | |
| 2012/0170001 A1* | 7/2012 | Sawai | G02B 27/285 353/20 |
| 2012/0268917 A1* | 10/2012 | Kitano | H04N 9/3105 362/84 |
| 2013/0010215 A1 | 1/2013 | Taketsu et al. | |
| 2013/0107223 A1* | 5/2013 | Toyooka | G03B 21/16 353/31 |
| 2013/0215401 A1* | 8/2013 | Inoko | G02B 27/0905 353/102 |
| 2015/0253469 A1* | 9/2015 | Le Gros | G02B 3/0006 359/619 |

FOREIGN PATENT DOCUMENTS

| | | |
|---|---|---|
| JP | 2004-354938 A | 12/2004 |
| JP | 2005-181965 A | 7/2005 |
| JP | 2005-292589 A | 10/2005 |
| JP | 2007-108763 A | 4/2007 |
| JP | 2007-519029 A | 7/2007 |
| JP | 2008-15501 A | 1/2008 |
| JP | 2008-65325 A | 3/2008 |
| JP | 2008-103692 A | 5/2008 |
| JP | 2009-134319 A | 6/2009 |
| JP | 2010-44298 A | 2/2010 |
| JP | 2011-154157 A | 8/2011 |
| JP | 2013-11790 A | 1/2013 |
| JP | 2013-15762 A | 1/2013 |

* cited by examiner

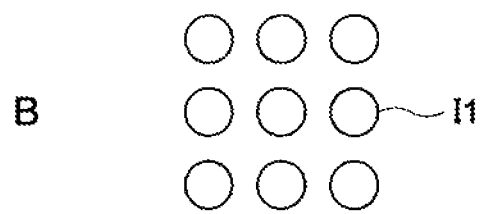
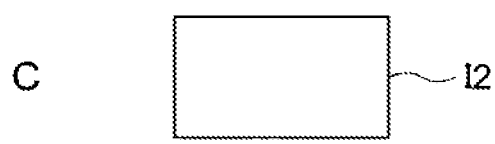
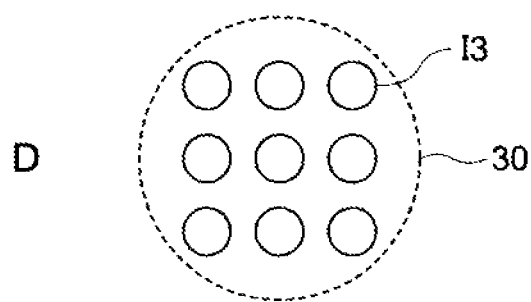
FIG.10

IMAGE DISPLAY APPARATUS AND IMAGE DISPLAY METHOD

CROSS-REFERENCE TO RELATED APPLICATIONS

This application is a continuation of U.S. application Ser. No. 14/776,191 filed Sep. 14, 2015, the entire content of which is incorporated herein by reference. U.S. application Ser. No. 14/776,191 is a National Stage of PCT/JP2013/007626, filed Dec. 26, 2013, which is based upon and claims the benefit of priority from prior Japanese Patent Application No. 2013-059748 filed Mar. 22, 2013.

TECHNICAL FIELD

The present technology relates to an image display apparatus such as a projector and to an image display method.

BACKGROUND ART

From the past, an image display apparatus such as a projector is widely used. For example, light from a light source is modulated by a light modulator such as a liquid-crystal device and the modulated light is projected onto a screen or the like. In this manner, an image is displayed. In the recent years, a projector using a laser light source as the light source also has been developed. Patent Document 1 describes a technology relating to an illumination optical system of such a projector.

Patent Document 1: Japanese Patent Application Laid-open No. 2013-15762

SUMMARY OF INVENTION

Problem to be Solved by the Invention

As an image display apparatus using the above-mentioned laser light source, it is desirable to develop a high-performance apparatus.

In view of the above-mentioned circumstances, it is an object of the present technology to provide a high-performance image display apparatus using a laser light source and an image display method.

Means for Solving the Problem

In the above-mentioned object, an image display apparatus according to an embodiment of the present technology includes a light source section, one or more reflection type light modulators, an optical system, and a light shielding plate.

The light source section includes at least one or more laser light sources.

The one or more reflection type light modulators modulate and reflect incident light.

The optical system divides light from the light source section into a plurality of split light beams, superimposes the plurality of split light beams on the one or more reflection type light modulators, and causes them to enter.

The light shielding plate is provided in the optical system, the light shielding plate including an aperture provided on a path of each of the plurality of split light beams, and a light shielding portion that shields reflection light from the reflection type light modulator to the light source section.

In this image display apparatus, the light from the laser light source is split into the plurality of split light beams and superimposed on the reflection type light modulators. At this time, without the light shielding plate shielding a plurality of split light beams traveling to the reflection type light modulator, reflection light from the reflection type light modulator to the light source section is shielded. With this, influences of that reflection light on the light source section can be prevented. As a result, a high-performance image display apparatus using the laser light source can be realized.

The optical system may include a first fly eye lens upon which light from the light source section is incident, and a second fly eye lens upon which light from the first fly eye lens is incident. In this case, the light shielding plate may be provided in vicinity of the second fly eye lens.

With this, it is possible to surely transmit the plurality of split light beams travelling to the reflection type light modulator.

The optical system may include a first optical system from the light source section to the second fly eye lens, and a second optical system from the second fly eye lens to the reflection type modulator. In this case, an optical axis of the first optical system and an optical axis of the second optical system may be shifted relative to each other.

With this, it is possible to sufficiently shield reflection light from the reflection type light modulator to the light source section.

The second fly eye lens may include a plurality of lens cells that are arranged in a column direction and a row direction. In this case, the first fly eye lens may form an image of the light source section on each of the plurality of lens cells of the second fly eye lens. Further, the aperture may have a size depending on a size of the formed image of the light source section.

With this, it becomes possible to display the image having a uniform illuminance.

The light shielding plate may include a plurality of strip-shaped apertures each having a predetermined width in the row direction and extending in the column direction, and the light shielding portion arranged between the plurality of apertures. The plurality of apertures may be arranged opposed to central regions of the plurality of lens cells.

With this, the light shielding plate can be formed with a simple structure.

The size of the width of each of the plurality of apertures may be a size of 50% or more and 80% or less of a size of the lens cell in the row direction.

With this, without lowering the light use efficiency, it is possible to sufficiently shield the reflection light to the light source section.

The aperture may be the same number of apertures as the plurality of lens cells arranged opposed to the central regions of the plurality of lens cells.

With this, it is possible to sufficiently shield the reflection light to the light source section.

The light shielding plate may be provided on a side of the reflection type light modulator of the second fly eye lens. In this case, the image display apparatus may further include a polarization conversion element.

The polarization conversion element is provided between the second fly eye lens and the light shielding plate and separates each of the plurality of split light beams into two, converts a polarization direction of one separated light beam, shift either one of the separated light beam obtained by converting the polarization direction and the other separated light-beam in the column direction, and emits them.

Further, in this case, the optical axis of the first optical system and the optical axis of the second optical system may be shifted relative to each other in the column direction and the row direction.

Due to the provision of the polarization conversion element, it becomes possible to cause the plurality of split light beams to enter the reflection type light modulator with the polarization directions of the plurality of split light beams being oriented to one direction with a high accuracy. Further, the light use efficiency can be enhanced.

The image display apparatus may further include a cooling section that cools the light shielding plate.

With this, it is possible to reduce influences of heat generated in the light shielding plate on other components.

The light shielding plate may be formed of a material having a high thermal conductivity.

With this, it is possible to reduce influences of heat on other components, which is generated in the light shielding plate.

The light shielding plate may be formed of a black surface-treated material.

With this, influences on other components due to re-reflection of light shielded by the light shielding plate can be reduced.

The one or more reflection type light modulators may include three reflection type light modulators that modulate red light, green light, and blue light, respectively. In this case, the optical system and the light shielding plate may be provided in each of the three reflection type modulators for each of the color light beams.

An image display method according to an embodiment of the present technology includes emitting light by a light source section including at least one or more laser light sources.

Light from the light source section is split into a plurality of split light beams and the plurality of split light beams are superimposed on a reflection type light modulator.

Reflection light from the reflection type light modulator to the light source section is shielded by a light shielding plate including an aperture provided on a path of each of the plurality of split light beams while a plurality of split light beams traveling to the reflection type light modulator through the aperture are transmit ted.

The plurality of superimposed split light beams are modulated and reflected by the reflection type light modulator to thereby display an image.

EFFECT OF THE INVENTION

As described above, according to the present technology, it is possible to provide a high-performance image display apparatus and an image display method.

BRIEF DESCRIPTION OF DRAWINGS

FIG. 10 A diagram schematically showing an image formed on each optical member.

MODE(S) FOR CARRYING OUT THE INVENTION

Hereinafter, embodiments according to the present technology will be described with reference to the drawings, <First Embodiment>

[Configuration of Image Display Apparatus]

Figure 1:
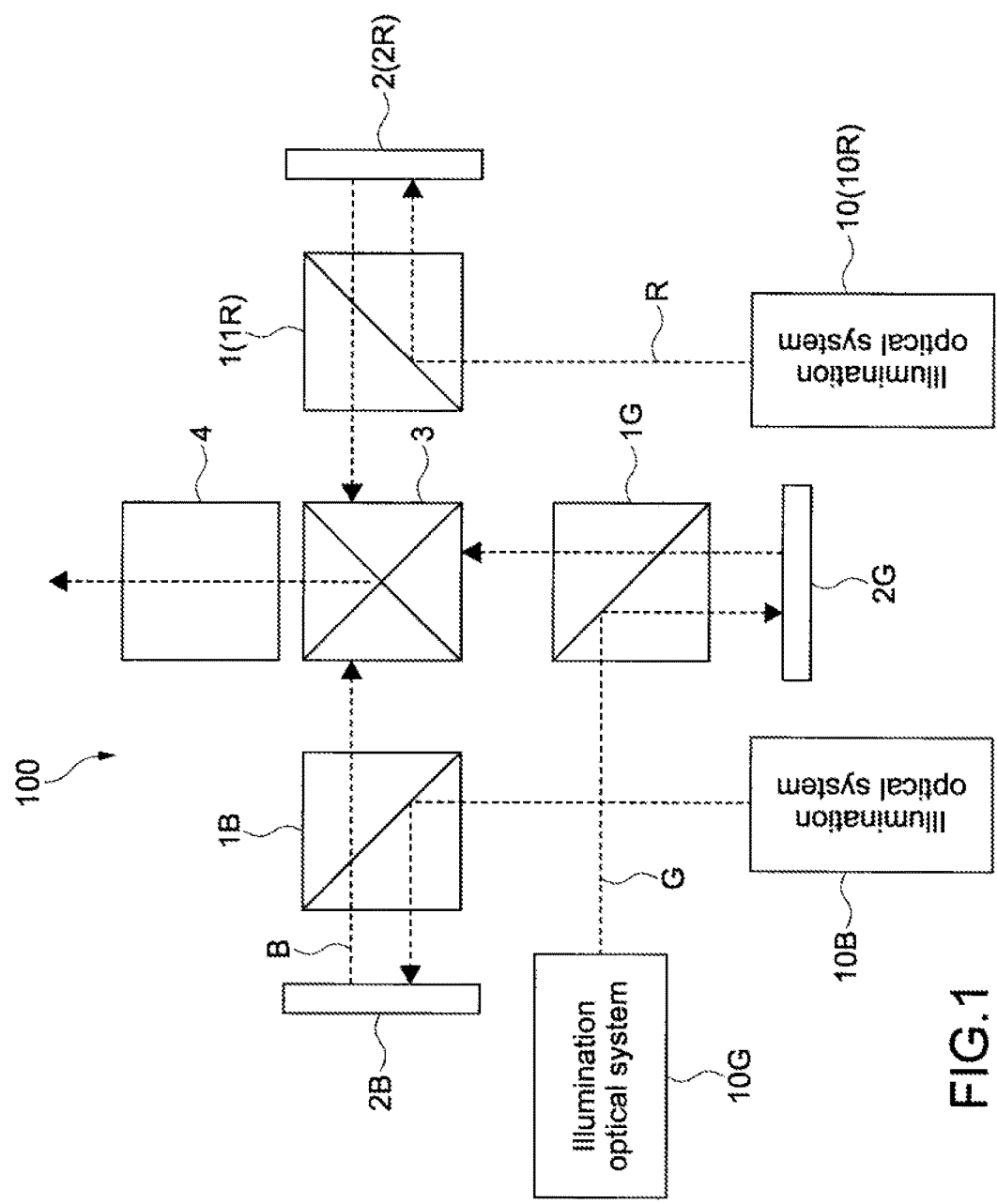
FIG. 1 A schematic diagram showing a configuration of an entire image display apparatus according to a first embodiment.

FIG. 1 is a schematic diagram showing a configuration of an entire image display apparatus according to a first embodiment of the present technology. An image display apparatus 100 modulates light for each of red, green, and blue light beams (each RGB color light beam) and combines the modulated light beams (images) for each color to thereby display a color image. As the image display apparatus 100, for example, a projector that projects an image onto a screen or the like is used.

The image display apparatus 100 includes an illumination optical system 10, a reflection type polarizer 1 (hereinafter, referred to as polarizer 1), a reflection type light modulator 2 (hereinafter, referred to as a light modulator 2), a color combining prism 3 (combining optical system), and a projection lens 4 (projection optical system). Specifically, three illumination optical systems 10, three polarizers 1, and three light modulators 2 are provided for the RGB color light.

The illumination optical system 10 is an illumination optical system including a light source section 11 (see FIG. 2) that emits laser light beams of the RGB colors. An illumination optical system 10R includes a light source section 11R that emits red laser light R. An illumination optical system 10G includes a light source section 11G that emits green laser light G. An illumination optical system 10B includes a light source section 11B that emits blue laser light B. The illumination optical system 10 emits each of color laser light beams R, G, and B from the light source section 11 to the light modulator 2. The light modulator 2 is a uniform illuminance portion and serves as a irradiated surface. The illumination optical systems 10 will be described later in detail.

The light modulator 2 is a reflection type light modulator. The light modulator 2 polarizes, modulates, and reflects incident laser light according to an image signal corresponding to each color light, which is supplied from the outside. As the light modulator 2, typically, a reflection type liquid-crystal device is used. However, it is not limited thereto.

The polarizer 1 reflects laser light of a predetermined polarization direction and transmits laser light of a polarization direction different from the predetermined polarization direction. The polarization direction of the laser light from the light source section 11 is set to the above-mentioned predetermined polarization direction. Therefore, the laser light from the light source section 11 is reflected to the light modulator 2 by the polarizer 1. The modulated light polarized, modulated, and reflected by the light modulator 2 enters the polarizer 1 again after being subjected to optical compensation (fine adjustment of phase modulation amount) by an optical compensation element (not shown). Depending on the degree of light modulation, a part of the laser light entering the polarizer 1 is transmitted therethrough and enters the color combining prism 3 while the other part is reflected back to the illumination optical system 10. For example, in the case of displaying a full black image, the laser light beams of the RGB colors are reflected without being modulated and reflected to the illumination optical systems 10 by the polarizers 1. As a result, most of laser light emitted from the illumination optical systems 10 is returned to the illumination optical systems 10 as optical feedback as it is.

The color combining prism 3 transmits incident light (laser light G) of the green wavelength in four directions of the projection lens 4 and reflects incident light (laser light R, B) of the red wavelength and the blue wavelength in four directions of the projection lens. The color combining prism 3 is formed by, for example, joining a plurality of glass prisms (four isosceles right prisms in substantially the same shape).

In the joined surfaces of the glass prisms, two interference filters having predetermined optical properties are formed. The first interference filter out of them reflects the blue laser light B and transmits the red laser light R and the green laser light G. The second interference filter reflects the reel laser light R and transmits the blue laser light B and the green laser light G. Due to such a color combining prism 3, laser light beams R, G, and B from light modulators 2R, 2G, and 2B are combined and emitted to the projection lens 4.

The projection lens 4 spreads the light combined by the color combining prism 3 to have a predetermined magnification and projects a video (image) onto the screen (not shown).

Figure 2:
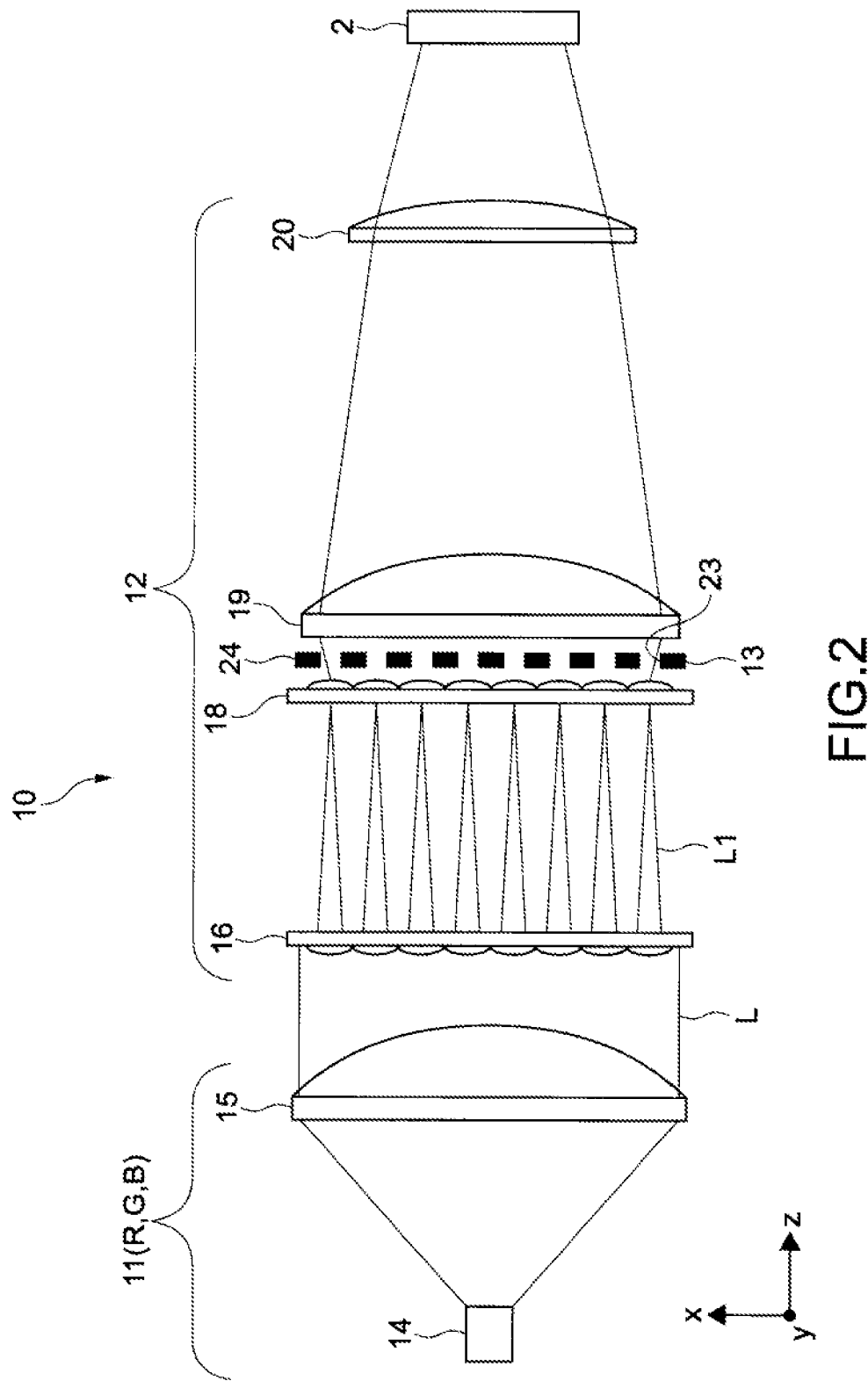
FIG. 2 A diagram showing a schematic configuration of the illumination optical system according to this embodiment.

FIG. 2 is a diagram showing a schematic configuration of the illumination optical system 10 according to this embodiment. The illumination optical systems 10 shown in FIG. 2 are used as the illumination optical systems 10R, 10G, and 10B for the laser light beams of the RGB colors. Note that, for the sake of simplification of the drawing, in FIG. 2, the illustration of the polarizer 1 provided in front of the light modulator 2 is omitted.

The illumination optical system 10 includes the light source section 11, an integrator optical system 12 serving as the optical system according to this embodiment, and a light shielding plate 13. The light source section 11 is formed of at least one or more laser light sources 14. The light source section 11 of this embodiment includes a single laser light source (single laser light source) 14, a spread angle (divergence angle) adjuster (not shown), and a collimator lens 15.

The configuration, of the laser light source 14 is not limited and any configuration can be used therefor. The spread angle adjuster can adjust laser light L from the laser light source 14 and includes, for example, a lens or the like located behind the laser light source 14. For example, the distance between the laser light source 14 and that lens is adjusted and defocus is achieved, such that the spread angle is adjusted. For the spread angle adjuster, any configuration can be employed. The collimator lens 15 emits the spread laser light L onto a first fly eye lens 16 of the integrator optical system 12 substantially uniformly. The size and the like of the collimator lens 15 may be appropriately set. Note that the spread angle adjuster may also adjust the divergence angle of the light emitted from the collimator lens 15.

Figure 3:
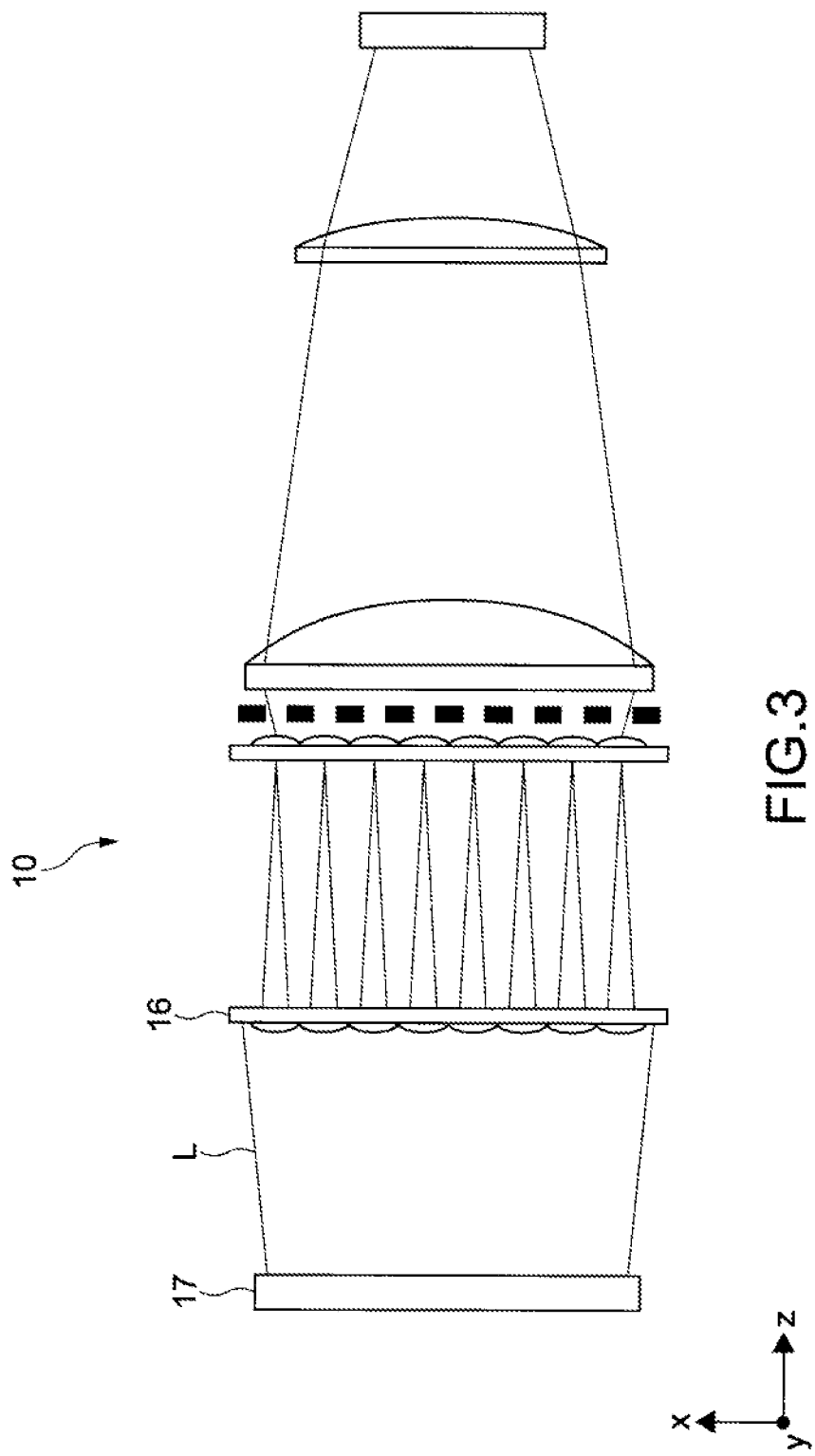
FIG. 3 A diagram showing another example of a light source section of the illumination optical system shown in FIG. 2.

The configuration of the light source section 11 is not limited to the configuration shown in FIG. 2. For example, as shown in FIG. 3, a two-dimensional laser array light source (surface light source) 17 may be used, in which a plurality of laser light sources 14 are arrayed in a two-dimensional manner. Using such a laser array light, source 17, the laser light L may be uniformly emitted onto the first fly eye lens 16. Thus, the spread angle of laser light from each laser light source may be appropriately adjusted. In the case of using the laser array light source 17, typically, the positions of the plurality of laser light sources and the positions of the plurality of lens cells of the first fly eye lens 16 are associated with each other.

The integrator optical system 12 splits the laser light L from the light source section 11 into a plurality of split light beams L1, and superimposes the plurality of split light beams L1 on the light modulator 2 and causes them to enter. The integrator optical system 12 includes the first fly eye lens 16, a second fly eye lens 18, a condenser lens 19, and a field lens 20. The laser light L from the light source section 11 is split by the first and second fly eye lenses 16 and 18 into the plurality of split light beams L1 and the illuminance is made uniform. The plurality of split light beams L1 are superimposed on the light modulator 2 through the condenser lens 19 and the field lens 20.

Figure 4:
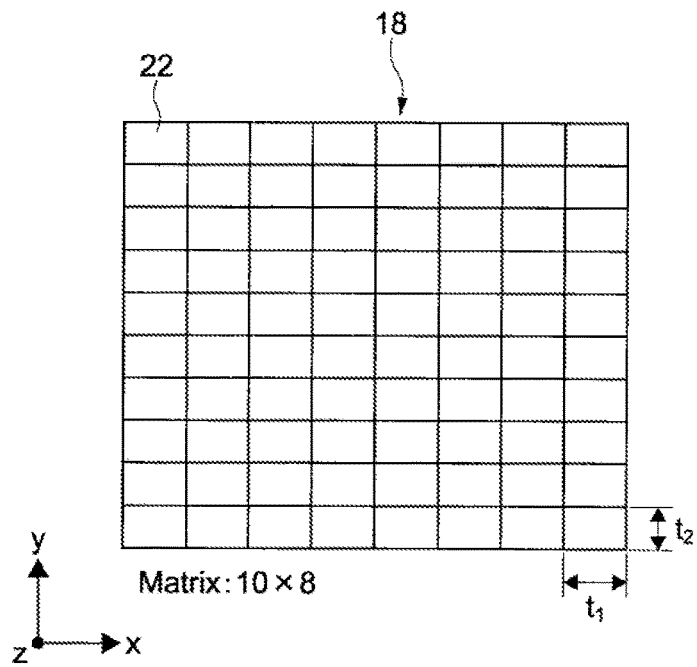
FIG. 4 A schematic diagram of a second fly eye lens according to this embodiment as viewed from the front.

FIG. 4 is a schematic diagram of the second fly eye lens 18 according to this embodiment as viewed from the front (as viewed in z-direction of FIG. 2). The second fly eye lens 18 includes a plurality of lens cells 22 arranged in a column direction (y-direction) and a row direction (x-direction). In this embodiment, 10 lens cells in the column direction and 8 lens cells in the row direction, that is, 80 lens cells 22 are arranged in a matrix form of 10*8. As shown in FIG. 4, in each of the lens cells 22, the x-direction is a long-axis direction and the y-direction is a short-axis direction. The size in the long-axis direction of each cell 22 will be referred to as a long-axis cell size t1 and the size of the short-axis direction will be referred to as a short-axis cell size t2. The number of lens cells 22 is not limited and may be appropriately set. Further, for example, a spherical lens is used as the lens cells 22. However, another lens may be used.

Corresponding to the plurality of lens cells 22 shown in FIG. 4, a plurality of lens cells are also formed on the first fly eye lens 16. The same number of lens cells as the plurality of lens cells 22 of the second fly eye lens 18 are formed on the first fly eye lens 16. The first and second fly eye lenses 16 and 18 are arranged opposed to each other such that the corresponding lens cells overlap with each other as viewed in an optical axis direction (z-direction) in which the laser light L from the light source section 11 travels. Therefore, the first and second fly eye lenses 16 and 18 are arrange without shifting the corresponding lens cells from each other. Further, in this embodiment, lens faces in a convex shape are arranged, both facing the outside. However, the orientations of the lens faces are not limited. The lens faces may be opposed to each other, the both facing the inside.

The configuration of a lens group for superimposing the plurality of split light beams L1 split by the first and second fly eye lenses 16 and 18 on the light modulator 2 is also not limited and may be appropriately designed.

Note that the laser light L emitted from the light source section 11 is linear polarization light. Its polarization direction is set to a predetermined polarization direction such that the above-mentioned polarizer 1 can reflect the light. Further, its polarization direction is set to coincide with the polarization direction of the light modulator 2. With this, the illumination optical system 10 can keep the light use efficiency high without adding a P/S conversion element (PS converter) or the like by retaining the polarization direction of the laser light L from the light source section 11.

For example, the polarization ratio of the laser light L emitted from the light source section 11 is equal to or larger than 10. That is, assuming that, when a subordinate polarized component of a P-component and an S-component is set to 1, a main polarized component is equal to or larger than 10. The laser light L having a higher polarization ratio may be emitted. Note that, if a desired polarization ratio cannot be obtained, a P/S converter or the like may be appropriately used for improving the optical efficiency.

Figure 5:
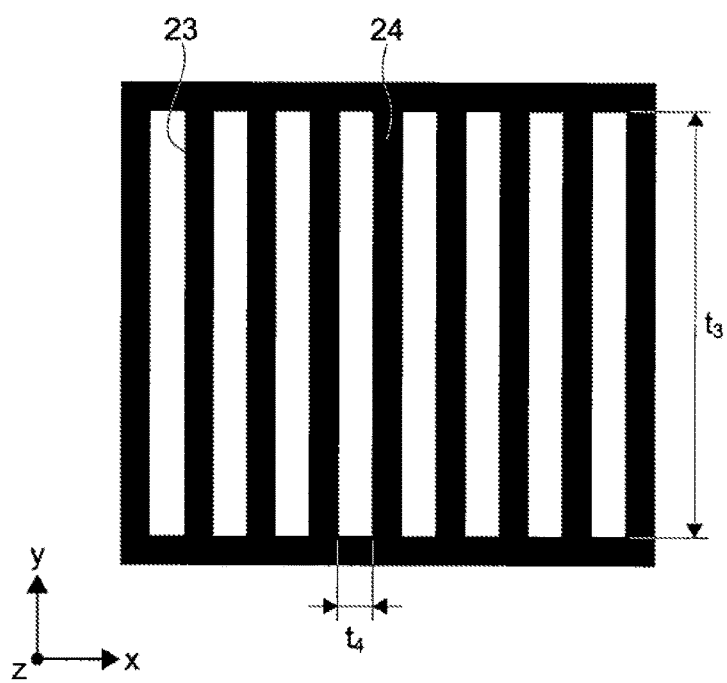
FIG. 5 A schematic diagram of a light shielding plate according to this embodiment as viewed from the front.

FIG. 5 is a schematic diagram of the light shielding plate 13 according to this embodiment as viewed from the front. The light shielding plate 13 is, as shown in FIG. 2, provided in the integrator optical system 12. The light shielding plate 13 includes apertures 23 arranged on paths of the plurality of split light beams L1 and light shielding portions 24 that shield reflection light returned from the light modulator 2 to the light source section 11. Note that, in FIG. 2, for easily grasping the orientation of the light shielding plate 13, the apertures 23 extending in the y-direction is shown.

The light shielding plate 13 is provided in vicinity of the second fly eye lens 18 in the optical axis direction (z-direction) in which the laser light L travels. In this embodiment, the light shielding plate 13 is provided between the second fly eye lens 18 and the condenser lens 19, immediately following the second fly eye lens 18 (on the side of the light modulator 2). Note that, as long as it is in vicinity of the second fly eye lens 18, the light shielding plate 13 may be provided immediately in front of the second fly eye lens 18 (on the side of the light source section 11).

The vicinity of the second fly eye lens 18 typically means a range within a several millimeters in the front or back of the second fly eye lens 18 in the z-direction. However, it is not limited to this range. The position in which the light shielding plate 13 can be provided is defined by a relationship between the size of the aperture 23 and the size of the light flux of each of the split light beams L1 in front and back of the second fly eye lens 18.

To be specific, due to the first fly eye lens 16, the image of the laser light source L is formed on each of the lens cells 22 of the second fly eye lens 18. Due to the second fly eye lens 18, the image of the first fly eye lens 16 is formed on the light modulator 2 through the condenser lens 19 or the like. Therefore, if the light shielding plate 13 is provided in the front of the second fly eye lens 18 at a distance from it, where an image is not formed on the second fly eye lens 18, the image is large. Thus, each of the split light beams L1 from the first fly eye lens 16 meets the light shielding portion 24 and the amount of light is reduced.

Also if the light shielding plate 13 is provided closer to the condenser lens 19 at a distance from the second fly eye lens 18, the image is gradually enlarged for forming the image of the first fly eye lens 16 on the light modulator 2, and hence the possibility that the light is shielded by the light shielding portion 24 is higher. A range in which the light shielding plate 13 can be provided only needs to be appropriately set not to cause such problems. By providing the light shielding plate 13 in vicinity of the second fly eye lens 18, the plurality of split light beams L1 can be suitably superimposed on the light modulator 2.

The light shielding plate 13 may be provided in a close contact with the second fly eye lens 18. Alternatively, the light shielding plate 13 may be provided at a predetermined distance from the second fly eye lens 18. In this case, it is possible to prevent heat generated in the light shielding plate 13 from being directly conducted to the second fly eye lens 18, other optical and mechanical components, and the like. Further, a clearance from the second fly eye lens 18 can be used as a flowing path for the air for cooling the light shielding plate 13.

As shown in FIG. 5, the light shielding plate 13 according to this embodiment has a predetermined width in the row direction (s-direction) of the second fly eye lens 18. The plurality of strip-shaped apertures 23 extending in the column direction (y-direction) are formed. The light shielding portions 24 are provided between the plurality of apertures 23. Eight apertures 23 as many as the number of columns of a plurality of lens arrays 22 shown in FIG. 4 are formed. A size t3 of each of apertures 24 in the long-axis direction is at least ten times as large as the size t2 of the short-axis cell of the plurality of lens arrays 22.

Figure 6:
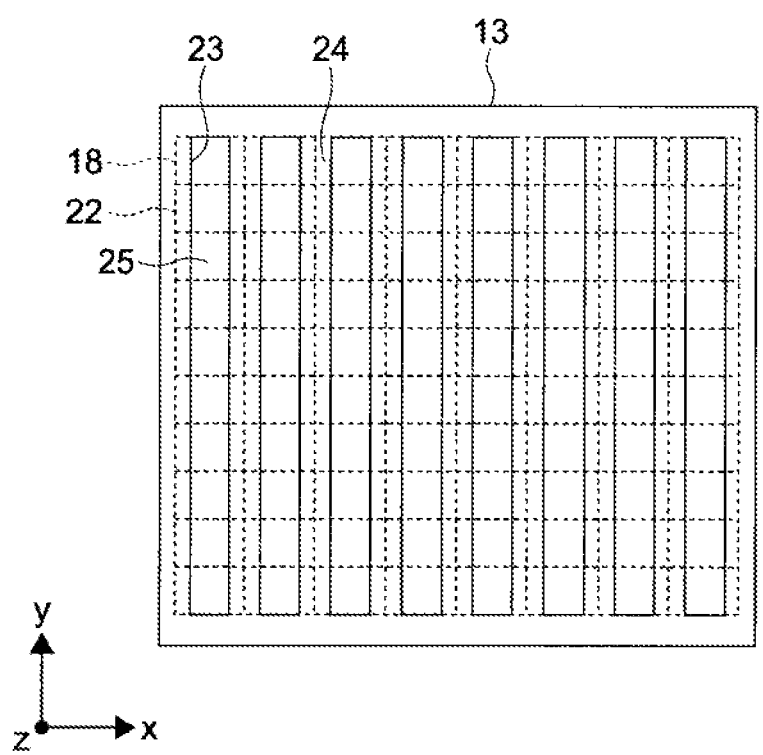
FIG. 6 A diagram schematically showing a position relationship between the second fly eye lens and the light shielding plate.

FIG. 6 is a diagram schematically showing a position relationship between the second fly eye lens 18 and the light shielding plate 13. As shown in FIG. 6, the light shielding plate 13 is provided such that the plurality of apertures 23 are arranged opposed to central regions 25 of the plurality of lens cells 22. The central regions 25 of the lens cells 22 mean regions within a predetermined range including a center of each lens cell 22. The central regions 25 are regions depending on the size of the light flux of each of the split light beams L1 travelling from the first fly eye lens 16. In other words, they are regions depending on the size of the image formed on each of the lens cells 22 of the second fly eye lens 18.

In this embodiment, a size t4 of a width of each of the plurality of apertures 23 (opening width) is set to a size of 50% or more and 80% or less of the long-axis cell size t1 of each of the plurality of lens cells 22 of the second fly eye lens 18, The size of the light shielding portion 24 is set such that the light shielding portion 24 is provided within a range of 20% or more and 50% or less of the long-axis cell size t1. The size of the aperture 23 with respect to the long-axis cell size t1 is not limited and may be appropriately set. If the size of the aperture 23 is too large, the light shielding rate of the optical feedback from the light modulator 2 is lowered. On the other hand, if the size of the aperture 23 is too small, light traveling from the light source section 11 to the light modulator 2 is shielded and the light use efficiency is lowered. The size of the aperture 23 may be appropriately adjusted considering those points. When the size of the aperture 23 was adjusted within the above-mentioned range, transmitting laser light and shielding the optical feedback were able to be suitably performed. In particular, in the case where the size t4 of the width of the aperture 23 is set to 65% of the long-axis cell size t1 and the light shielding portion 24 is set to 35%, light of almost 100% was able to pass through the aperture. Regarding the optical feedback, about 80% was able to be shielded by the light shielding plate 13.

The size of the aperture 23 is set with respect to the long-axis cell size t1 of the lens cell 22 as described above. The size of the aperture 23 is not limited thereto and may be appropriately set under other conditions. For example, depending on the size of the image formed on each of the lens cells 22 of the above-mentioned second fly eye lens 18, the size of the aperture 23 may be appropriately set. Typically, the size of the aperture 23 is set to be larger than at least the size of the image. By appropriately setting the size of the aperture 23 depending on the formed image, the plurality of split light beams L1 can be suitably superimposed on the light modulator 2 while the reflection light returned to the light source section II can be sufficiently shielded.

For the material of the light shielding plate 13, metal such as stainless steel is used. In many cases, the light shielding plate 13 gets a high temperature due to the reflection light returned from the light modulator 2. Therefore, the material having a high thermal conductivity such as aluminum and copper may be used. With this, heat influences on the other optical and mechanical components can be reduced. Further, in order to prevent the optical feedback, which is shielded by the surface of the light shielding plate 13, from being reflected again and entering the light source section 11 and other members, a black surface-treated material may be used. The surface treatment method is not limited and painting, plating, anodizing, or chemical conversion coating, and the like may be appropriately used.

Figure 7:
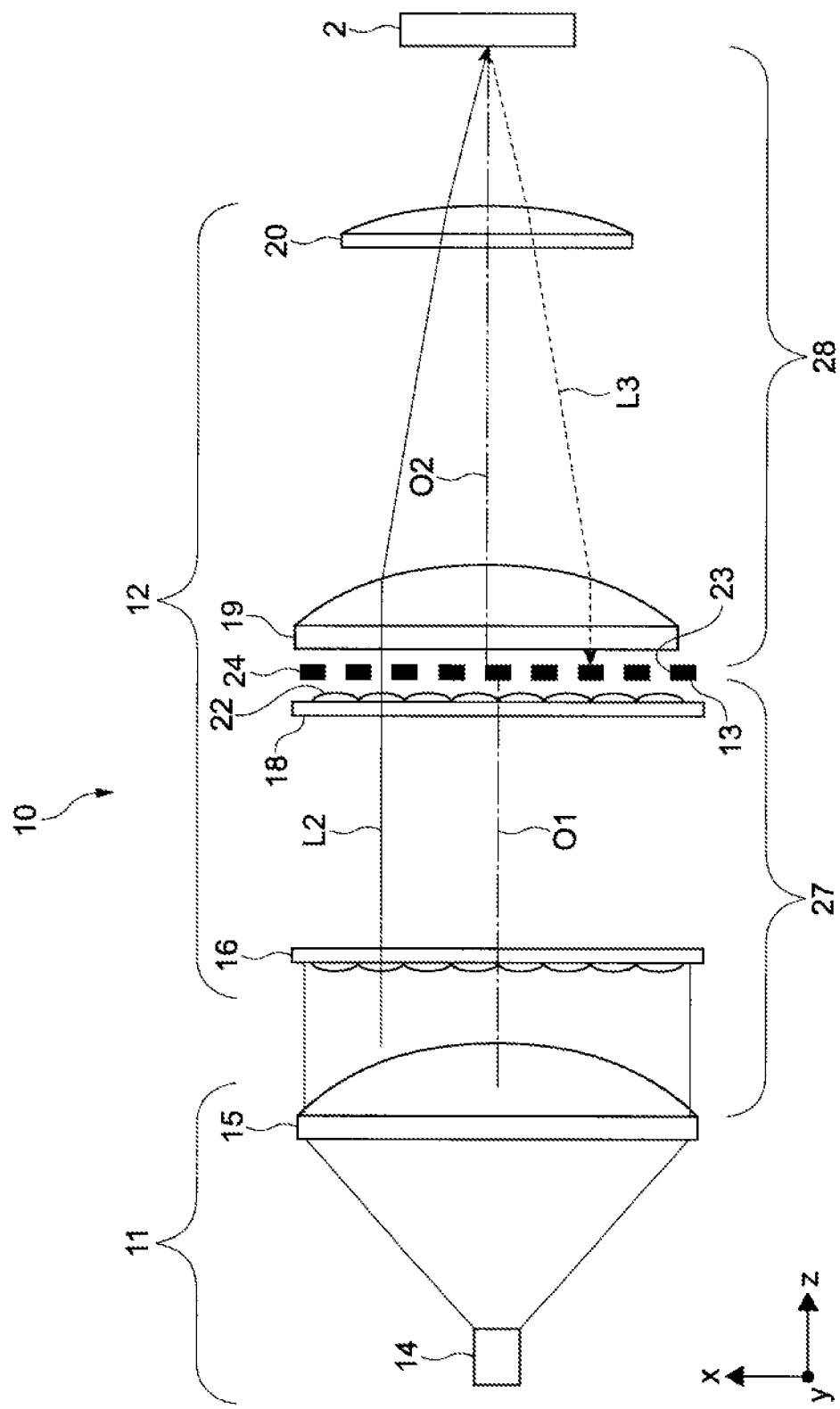
FIG. 7 A diagram showing a detailed configuration of the illumination optical system according to this embodiment.

FIG. 7 is a diagram showing a detailed configuration of the illumination optical system 10 according to this embodiment. In the integrator optical system 12 shown in FIG. 7, the optical system from the light source section 11 to the second fly eye lens 18 will be referred to as a first optical system 27. The optical system from the second fly lens 18 to the light modulator 2 will be referred to as a second optical system 28. Therefore, the first fly eye lens 16 shown in FIG. 7 is included in the first optical system 27 and the condenser lens 19 and the field lens 20 are included in the second optical system 28.

A path extending through a center of each of the first and second fly eye lenses 16 and 18 and the light shielding plate 13 are set as an optical axis of the first optical system 27 (referred to as first optical axis O1). This first optical axis O1 is set to substantially the center of laser light emitted from the collimator lens 15 (or two-dimensional laser array light source 17). That is, the position of the single laser light source 14 (or the center position of the two-dimensional laser array light source 17) is aligned with the first optical axis O1. As a result, the laser light L from the light source section 11 travels with the first optical axis O1 being a reference.

On the other hand, a path extending through the center of each of the condenser lens 19 and the field lens 20 is set as the optical axis of the second optical system 28 (referred to as second optical axis O2). This second optical axis O2 is adjusted to an incident position of the polarizer 1 (light modulator 2) behind them. Therefore, the laser light L entering the second optical system 28 enters the polarizer 2 (light modulator 1) with the second optical axis O2 being a reference.

In this embodiment, the optical axis O1 of the first optical system 27 and the second optical axis O2 of the second optical system 28 are set to be shifted relative to each other in the row direction (x-direction). Therefore, the laser light L emitted from the second fly eye lens 18 through the apertures 23 of the light shielding plate 13 with the first optical axis O1 being a reference travels to the light modulator 2 with the second optical axis O2 being a reference.

For example, laser light L2 (split light beams) shown in FIG. 7 passes through substantially the centers of the lens cells 22 of the second fly eye lens and enters the second optical system 28 through the apertures 23, The laser light L2 entering the condenser lens 19 of the second optical system 28 passes through the field lens 20 and the polarizer 1 (not shown) and enters the light modulator 2 with the second optical axis O2 being a reference. Here, if the polarized light is not modulated by the light modulator 2, reflection light L3 reflected by the light modulator 2 is reflected by the polarizer 1 to the light source section 11. As a result, the reflection light L3 passes through the field lens 20 and the condenser lens 19 via a position symmetric to the going laser light L2 with respect to the second optical axis O2. As a result, as shown in FIG. 7, the reflection light emitted from the condenser lens 19 to the light source section 11 is shielded by the light shielding portion 24 of the light shielding plate 13. With this, influences of the reflection light L3 on the light source section 11 can be prevented.

Figure 8:
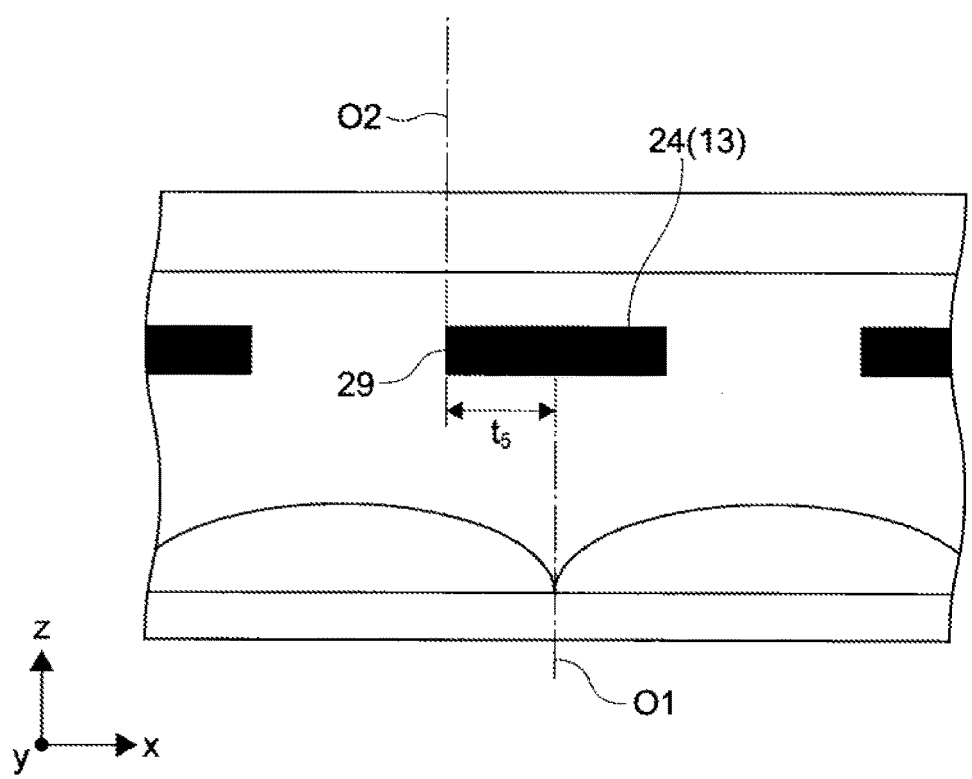
FIG. 8 A diagram for explaining a shift amount of first and second optical axes.

FIG. 8 is a diagram for explaining a shift amount between the first and second optical axes O1 and O2. As shown in FIG. 8, in this embodiment, the position of the second optical axis O2 is adjusted to an end 29 of the light shielding portion 24 that is the center of the light shielding plate 13, the light shielding portion 24 being located at the position of the first optical axis O1. That is, a shift amount t5 between the first and second optical axes O1 and O2 is substantially half of the size of the width of the light shielding portion 24 (size in row direction). This shift amount t5 is not limited and only needs to be appropriately set such that the aperture 23 is positioned on the path of the laser light L2 while the returned reflection light L3 is shielded by the light shielding portion 24.

The configurations of the light shielding plate 13 and the like may be set such that the shift amount, t5 is ¼ of the long-axis lens size t1 of each of the lens arrays 22 of the second fly eye lens 18. In this embodiment, the polarization direction of the laser light L is set by the light source section 11 in advance, and hence the polarization conversion element. (PS converter) is not used. Here, for example, the above-mentioned polarization conversion element becomes necessary in the case where the laser light source 14 is replaced by the non-polarization light source such as a lamp. In the case of using the polarization conversion element, the optical axis of light that has passed through the polarization conversion element is necessarily shifted by an amount corresponding to ¼ of the long-axis cell size t1 of the second fly eye lens 18. Therefore, by setting the shift amount between the first and second optical axes O1 and O2 to the above-mentioned shift amount, even if the laser light source 14 is replaced by the non-polarization light source, it can be addressed by the same mechanical structure.

[Operation of Image Display Apparatus]

Figure 9:
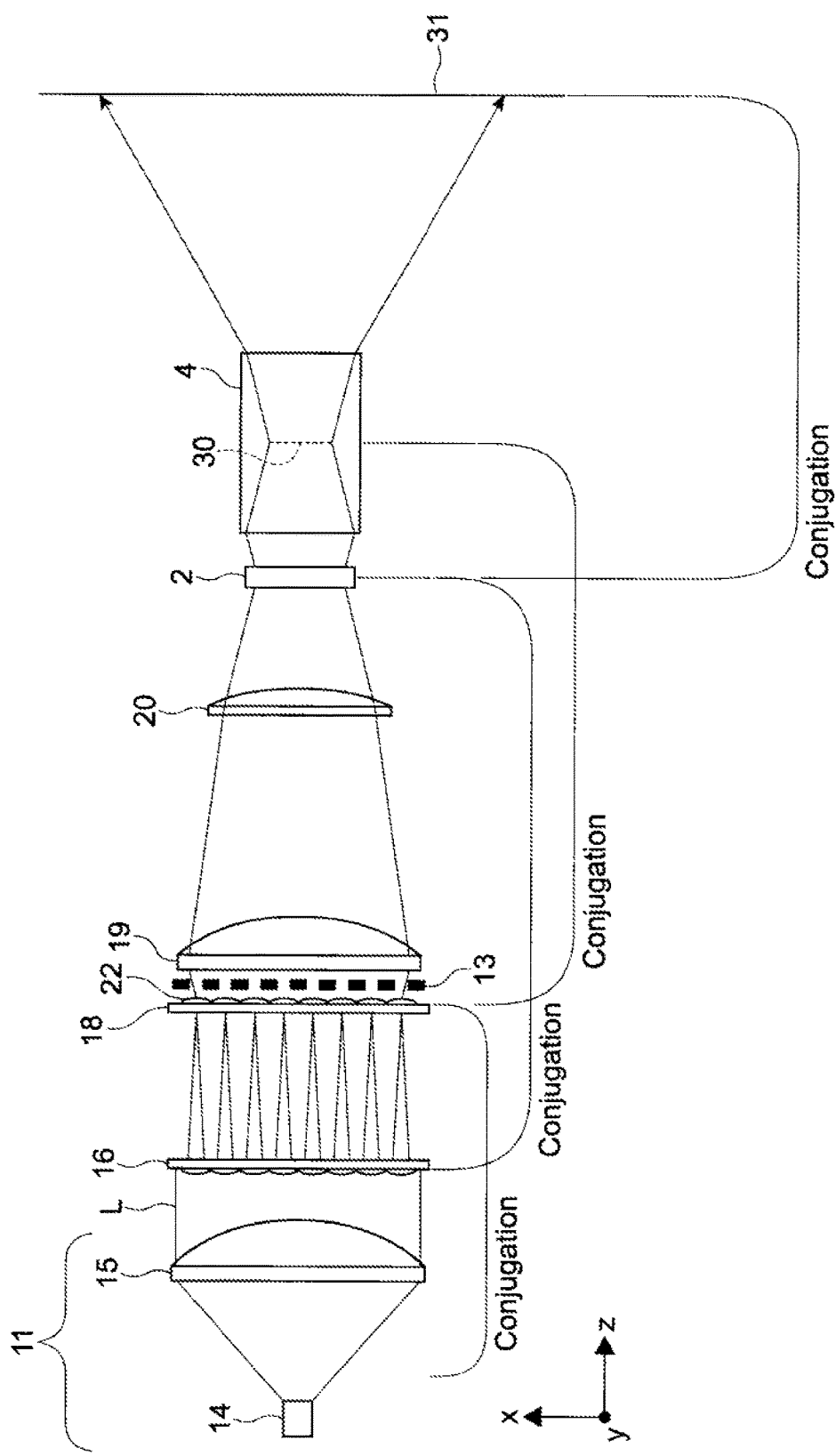
FIG. 9 A diagram schematically showing an optical principle (image transition) of image display in this embodiment.

FIG. 9 is a diagram schematically showing an optical principle (image transition) of image display in the image display apparatus 100 according to this embodiment. FIG. 10 is a diagram schematically showing images formed on each of the optical members. In FIG. 9, the illustration of the reflection type polarizer 1 is omitted. Therefore, the light polarized and modulated by the reflection type light modulator 2 is shown passing through the light modulator 2 for the sake of description. FIG. 10 is a schematic diagram for mainly explaining the transition of the image from the laser light source 14. In this FIG., the relative size of images, the number of images of the plurality of split light beams L1, and the like are different from reality.

First, the image of the light source section 11 is formed on the second fly eye lens 18 through the first fly eye lens 16. For example, in the case where the laser light source 14 of the light source section 11 has a circular shape (FIG. 10A), images I1 having substantially the same circular shapes are formed on the lens cell 22 of the second fly eye lens 18 (FIG. 10B). Next, an image I2 of each lens cell (rectangular shape) of the first fly eye lens 16 uniformly irradiated with light from the light source section 11 are formed on the light modulator 2 through the second fly eye lens 18 (FIG. 10C).

Figure 11:
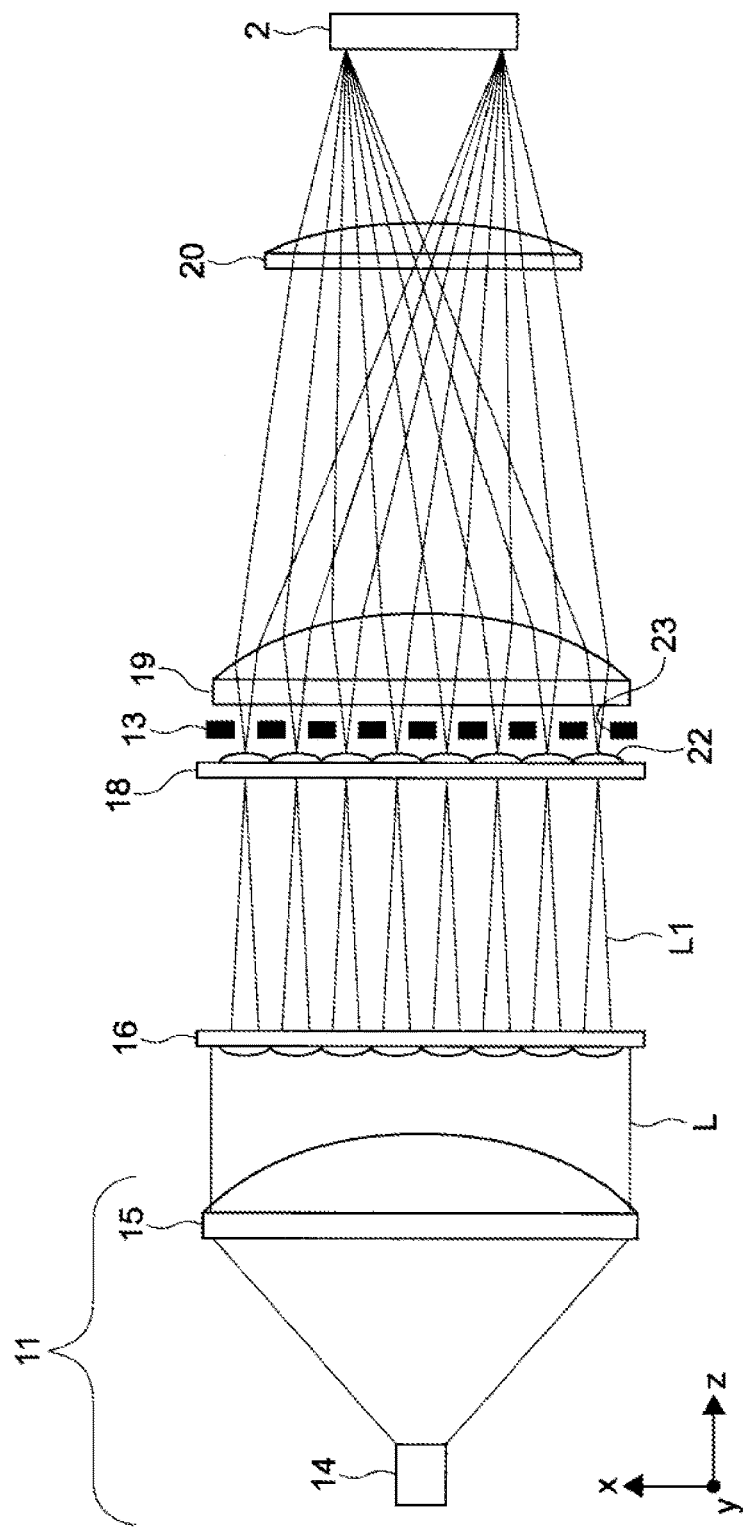
FIG. 11 A diagram showing how an image of each lens cell (rectangular shape) of the first fly eye lens is formed on the light modulator through the second fly eye lens.

FIG. 11 is a diagram showing the formation of the image in detail. By each of the lens cells 22 of the second fly eye lens 18, the image I2 of each of the lens cells of the first fly eye lens 16 is formed on the light modulator 2 through the aperture 23 of the light shielding plate 13, the condenser lens 19, and the field lens 20. As a result, each of the plurality of split light beams L1 is emitted and superimposed on the entire light modulator 2. Depending on the size of the image I1 shown in FIG. 10B, the aperture 23 of the light shielding plate 13 is formed in a size such that at least light of the image I1 can be transmitted therethrough.

Referring back to FIG. 9, images I3 of the second fly eye lens 18 are formed at the position of a stop 30 in the projection lens 4 through the light modulator 2. At this time, in the stop 30 of the projection lens 4, images having substantially the same circular shapes as the shapes of the laser light source 13 formed in a matrix form are formed as the images I3 of the second fly lens (FIG. 10D). Finally, an image I4 having a rectangular shape of the light modulator 2 is formed on a screen 31 via the stop 30 of the projection lens 4 (FIG. 10E).

Based on such an optical principle, the laser light L from the light source section 11 is modulated by the light modulator and projected onto the screen 31 as the image. Applying this principle to the image display apparatus 1 shown in FIG. 1, the laser light beams of the RGB colors R, G, and B are modulated by the light modulators 2R, 2G, and 2B, respectively. The modulated light beams of the colors are combined by the color combining prism 3 and projected onto the screen 31 via the projection lens 4. In this manner, the color image is displayed.

As described above, in this embodiment, the light from the laser light source 14 is split into the plurality of split light beams L1 by the first and second fly eye lenses 16 and 18 and superimposed on the light modulator 2 by the second optical system 28. The light shielding plate 13 is provided in vicinity of the second fly eye lens 18. Without shielding the plurality of split light beams L2 traveling to the light modulator 2, this light shielding plate 13 shields the reflection light L3 from the light modulator 2 to the light source section 11 as shown in FIG. 7. With this, influences of the reflection light L3 on the light source section 11 can be prevented. As a result, the high-performance image display apparatus 100 using the laser light source 14 can be achieved.

In the above-mentioned image display, in order to display an image having a uniform illuminance on the screen 31, it is necessary to uniformly irradiate the light modulator 2 with light. In order to uniformly irradiate the light modulator 2 with light, it is necessary to uniformly emit the light from the light source section 11 to the first fly eye lens 16. For this, the spread angle from the laser light source 14 (also including the spread angle from the collimator lens 15) is controlled and the laser light L is emitted to the first fly eye lens 16, having an increased spread angle.

When the spread angle of the light from the light source section 11 is increased, the image I1 formed on the second fly eye lens 18 has a predetermined size. That is based on the optical principle "Lagrange Invariant." To briefly explain, a product of the size of an object as a light-emitting point and the angle of light emitted from the object is not changed irrespective of which optical system the light passes through. If the light from the light source section 11 is parallel light, the image I1 formed by each of the lens cells of the first fly eye lens 16 becomes a point theoretically.

As described above, in this embodiment, depending on the size of the image I1 shown in FIG. 10B, the aperture 23 of the light shielding plate 13 is formed in a size such that at least the light of the image I1 can be transmitted therethrough. To describe this point in further detail, in order to uniformly irradiate the first fly eye lens 16 with the light from the light source section 11, the light from the light source section 11 is emitted not. as the parallel light but having a certain spread angle. As a result, the image I1 on the second fly eye lens 18 has a predetermined size and the aperture 23 of the light shielding plate 13 is formed in a size depending on the size of this image I1. To put it another way, by forming the aperture 23 with such a size, it becomes possible to display an image having a uniform illuminance on the screen 31.

By adequately adjusting the spread angle of the light from the light source section 11, it is also possible to voluntarily adjust the size of the image I1 formed on the second fly eye lens 18. That is, it is also possible to adjust the divergence angle from the light source section 11 (including the lens), make a design such that the image of the light source section 11 has a predetermined size on the second fly eye lens 18, and design the size t4 of the width of the aperture 23 of the light shielding plate 13 adequately depending on it. For example, the following design is also conceivable. Specifically, the divergence angle may be adjusted such that the size of the image I1 is 50% or more and 80% or less of the long-axis cell size t1 of the second fly eye lens 18, the size t4 of the width of the aperture 23 may be correspondingly 50% or more and 80% or less of the long-axis cell size t1, and the rest may be set as a light shielding region.

In recent years, the laser technology has been greatly developed and it is possible to achieve a high optical output with a compact size at high efficiency. In comparison with the lamp used as the light source of the conventional projector, the laser light source can achieve a high luminance and a wide color gamut. In addition, the laser light source is long-life. Therefore, the laser light source has many merits, for example, the maintenance cost of the light source can be reduced. Due to the commercial propagation of 3D and the like, it is desirable to provide higher luminance products. A projector employing laser as the light source is being developed.

However, in the case where a laser light source is mounted on the projector using the conventional non-reflection, type liquid-crystal device, most of light, reflected from the reflection type liquid-crystal device when video display is made black is returned to the light source due to straight traveling property and coherency that characterize the laser. Therefore, there have been problems that the temperature of a laser emitting device increases and the optical properties are changed, the life of the laser emitting device itself is shortened, and the like. Therefore, it has been desirable to shield the optical feedback to the light source and prevent a change in the optical properties and shortening of the life due to an increase in the temperature of the laser emitting device.

As described above, according to the illumination optical system 10 and the image display apparatus 100 of this embodiment, it is possible to shield the optical feedback on the side of the light source 11 by providing the light shielding plate 13 in the integrator optical system 12. With this, it is possible to prevent the change in the optical properties and the shortening of the life due to the increase in the temperature of the laser emitting device. As a result, a stable performance as a product can be provided and the original merit, of the laser, which is the long life, is utilized, and hence it is possible to greatly reduce the maintenance cost in comparison with the lamp used in the conventional projector.

<Second Embodiment>

An image display apparatus of a second embodiment according to the present technology will be described. In the following description, regarding the same portions as the configuration and action of the image display apparatus 100 described in the above-mentioned embodiment, descriptions thereof will be omitted or simplified.

Figure 12:
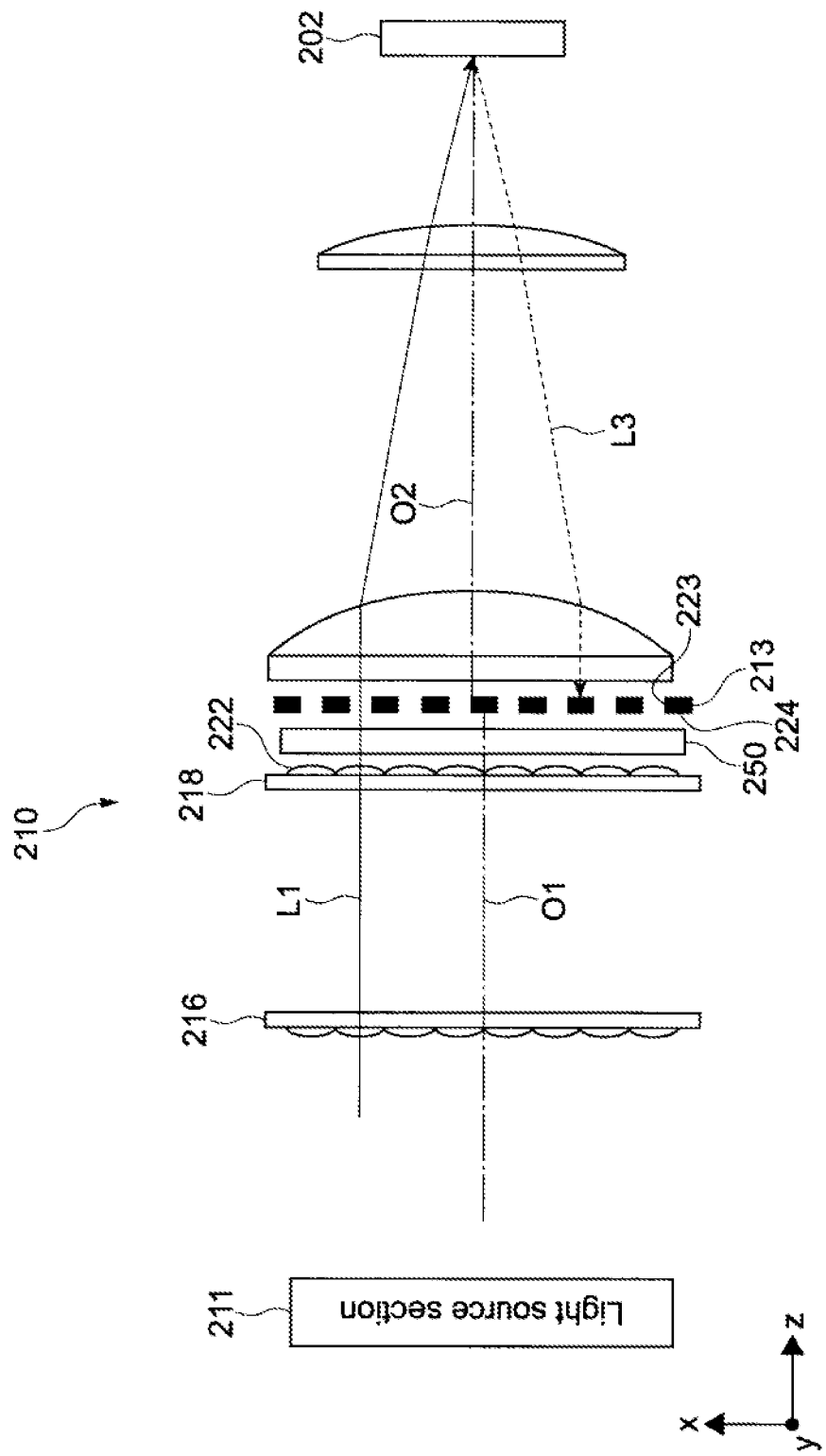
FIG. 12 A diagram (top view) showing a schematic configuration of an illumination optical system according to a second embodiment.
Figure 13:
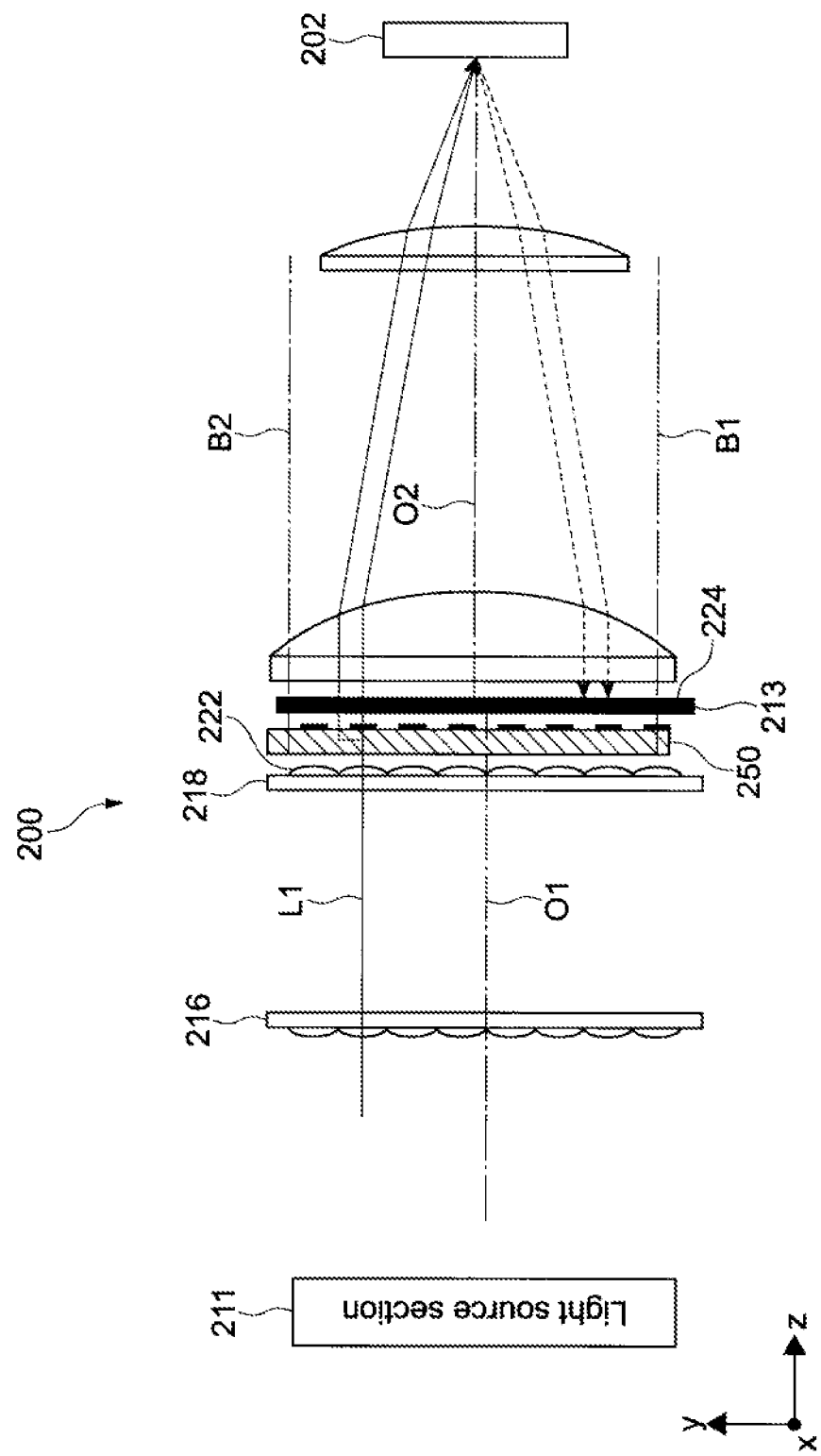
FIG. 13 A diagram (side view) showing a schematic configuration of the illumination optical system according to the second embodiment.

FIGS. 12 and 13 are diagrams showing a schematic configuration of an illumination optical system 210 according to this embodiment. FIG. 12 is a diagram of the illumination optical system 210 as viewed from the top (y-direction) and is a diagram corresponding to FIG. 4 according to the first embodiment. FIG. 13 is a diagram of the illumination optical system 210 as viewed from the side (x-direction).

As in the first embodiment, in first and second fly eye lenses 216 and 218, a column direction and a row direction are set to a y-direction and an x-direction, respectively. Therefore, a long-axis direction of a lens cell 222 is the x-direction and a short-axis direction is the y-direction. A light shielding plate 213 includes a plurality of apertures 223 extending in the column direction and is provided on a side of a light modulator 202 of a second fly eye lens 218. In FIG. 12, in order to grasp the orientation of the light shielding plate 213, the apertures 223 extending in the y-direction are shown. In FIG. 13, light shielding portions 224 between the apertures 223 are shown.

In this embodiment, between the second fly eye lens 218 and the light shielding plate 213, a PS converter 250 is provided as the polarization conversion element. The PS converter 250 separates each of the plurality of split light beams L1 emitted from the second fly eye lens 218 into two based on the polarization direction and converts the polarization direction of the one separated light beam. Either the separated light beam obtained by converting that polarization direction or the other separated light beam is shifted in the column direction and the light beams are emitted.

Figure 14:
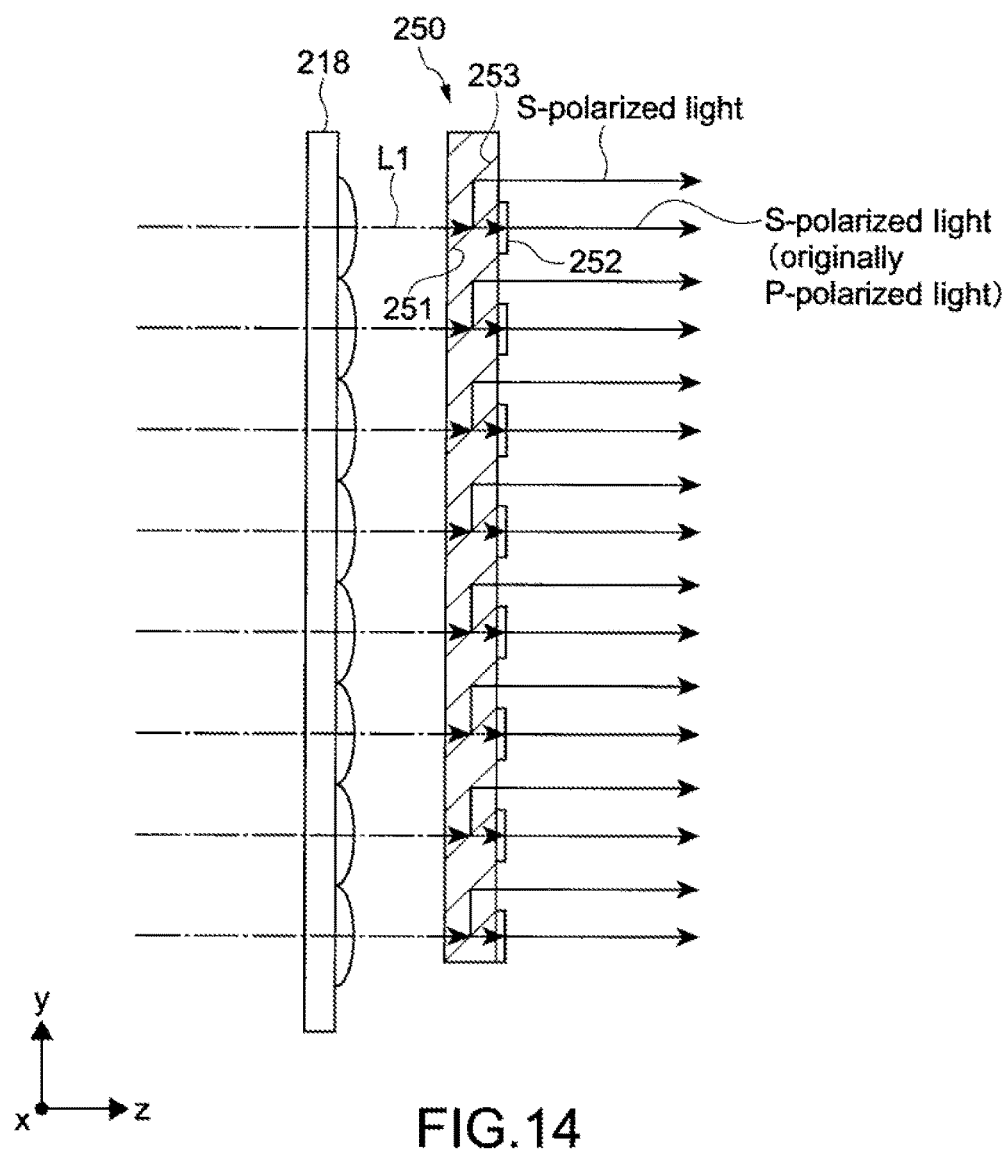
FIG. 14 A diagram for explaining an operation of a PS converter according to this embodiment.
Figure 15:
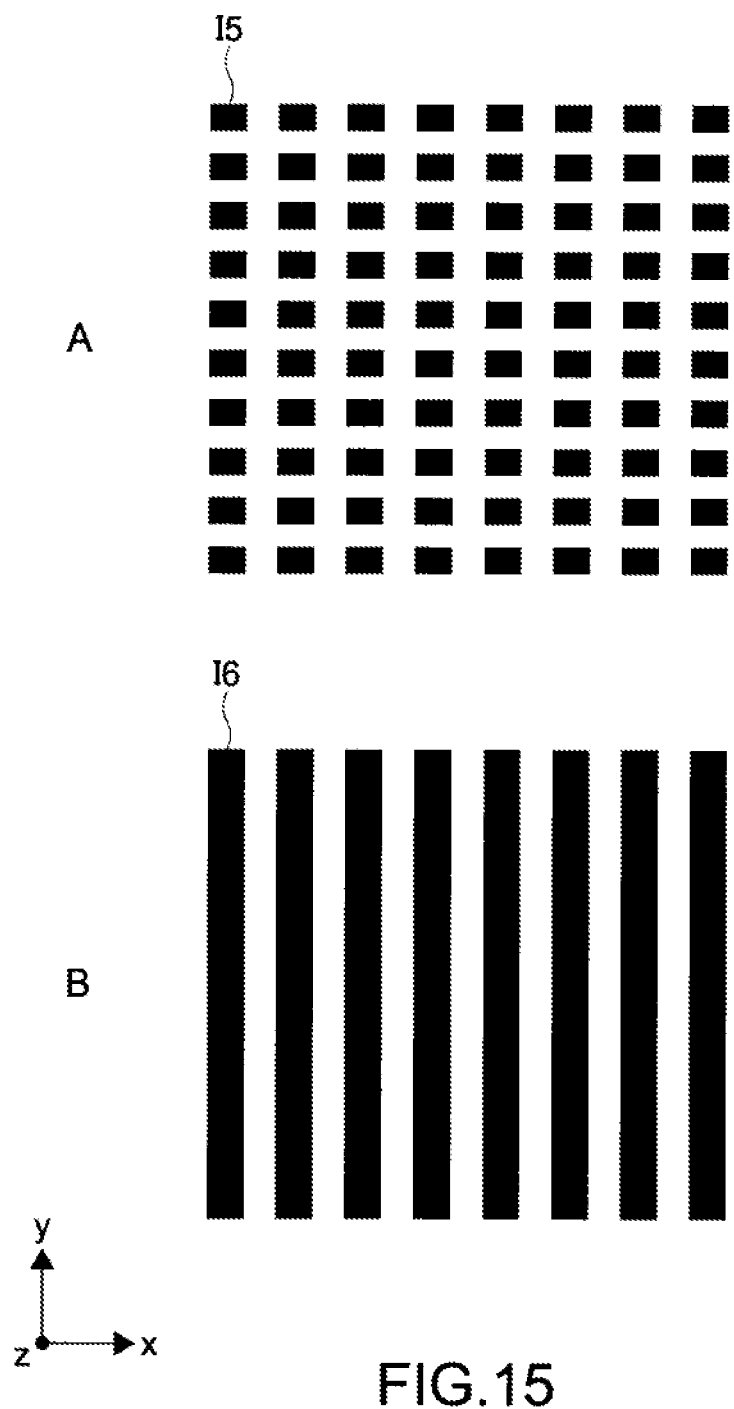
FIG. 15 A diagram for explaining an operation of the PS converter according to this embodiment.

FIGS. 14 and 15 are diagrams for explaining an operation of the PS converter 250. Typically, in the case of using the non-polarization light source, the PS converter 250 is used for orienting polarized light beams of light incident upon the light modulator to one direction. In this embodiment, laser light whose polarized light beams are oriented to one direction is emitted by a laser light source 211. However, more precisely, the light (each of the split light beams L1) emitted from the second fly eye lens 218 is, in many cases, light including P-polarized light and S-polarized light. Therefore, by using the PS converter 250 to correct polarization directions to one direction again, it becomes possible to cause light whose polarization direction is oriented to the one direction to enter the light modulator 202 with high accuracy.

As shown in FIG. 14, the split light beams L1 (P+S-polarized light) passing through the second fly eye lens 218 are separated into a P-polarized light beam (one separated light beam) and a S-polarized light beam (other separated light beam) by a PS separation film 251 in the PS converter 250. The P-polarized light is transmitted therethrough as it is and the S-polarized light is reflected in the column direction (y-direction). Regarding the P-polarized light transmitted therethrough, the polarization is rotated by a ½-wavelength plate 252 and the light is emitted as the S-polarized light. The S-polarized light reflected by the PS separation film 251 is further-reflected and emitted by an S-reflective film 253. This S-polarized light is shifted in the column direction and emitted. In this manner, all the light beams emitted from the PS converter 250 become S-polarized light beams.

FIG. 15A is a schematic diagram of images I5 of light emitted from the second fly eye lens 18. FIG. 15B is a schematic diagram of images I6 of light emitted from the PS converter 250. The S-polarized light separated by the PS separation film 251 is shifted in the column direction and emitted, and hence the images I6 of the light are formed extending in the column direction. Depending on the positions and the size in the column direction of the images I6, the strip-shaped apertures 223 are formed. With this, light whose polarization direction is oriented to one direction with a high accuracy can be made incident upon the light modulator 202 while providing a high light use efficiency.

Mote that the position of the ½-wavelength plate 252 of the PS converter 250 may be set to be on a path for light shifted in the column direction and emitted. With this, the polarization direction of the light emitted from the PS converter 250 can be changed. For example, in the example shown in FIG. 14, the ½-wavelength plate 252 is bonded on a side to which the light is reflected by the S-reflective film 253 and shifted in the column direction. With this, ail the light beams emitted from the PS converter 250 become the P-polarized light beams. For example, in the case where the liquid-crystal device serving as the light modulator 202 is irradiated with light, appropriate settings only need to be made such that the polarization direction is the long-side direction of the liquid-crystal device.

Here, the shift amount between the first optical axis O1 of the first optical system and the second optical axis O2 of the second optical system will be described. As shown in FIG. 12, the first optical axis O1 and the second optical axis O2 are shifted from each other in the row direction (x-direction). As described in the above first embodiment, this is for shielding the reflection light L3 to the light source section 211 by the light shielding portion 224. The shift amount may be appropriately set.

As shown in FIG. 13, the first optical axis O1 and the second optical axis O2 are shifted from each other also in the column direction (y-direction). This is performed by the PS converter 250 shifting the optical axis of the emitted light. That is, an intermediate position between a lowest light beam B1 and a top light beam B2 of the light emitted from the PS converter 250 shown in FIG. 13 becomes an optical axis. The position becomes a position shifted in the y-direction by ¼ of the short-axis cell size of each of the lens cells 222 of the second fly eye lens 218. Corresponding to this optical axis, the second optical axis O2 of the second optical system is also shifted in the y-direction by ¼ of the short-axis cell size. As a result, in this embodiment, the first optical axis O1 and the second optical axis O2 are shifted relative to each other in the column direction and the row direction.

Note that, in this embodiment, by separating the light in the y-direction and shifting the optical axis in the x-direction, the optical feedback is cut. In contrast, the light may be separated in the x-direction and the optical axis may be shifted in the y-direction. In this case, a plurality of strip-shaped apertures extending in the x-direction only need to be formed. Also with this configuration, the same effects can be obtained.

<Other Embodiments>

The present technology is not limited to the above-mentioned embodiments and various other embodiments can be made.

Figure 16:
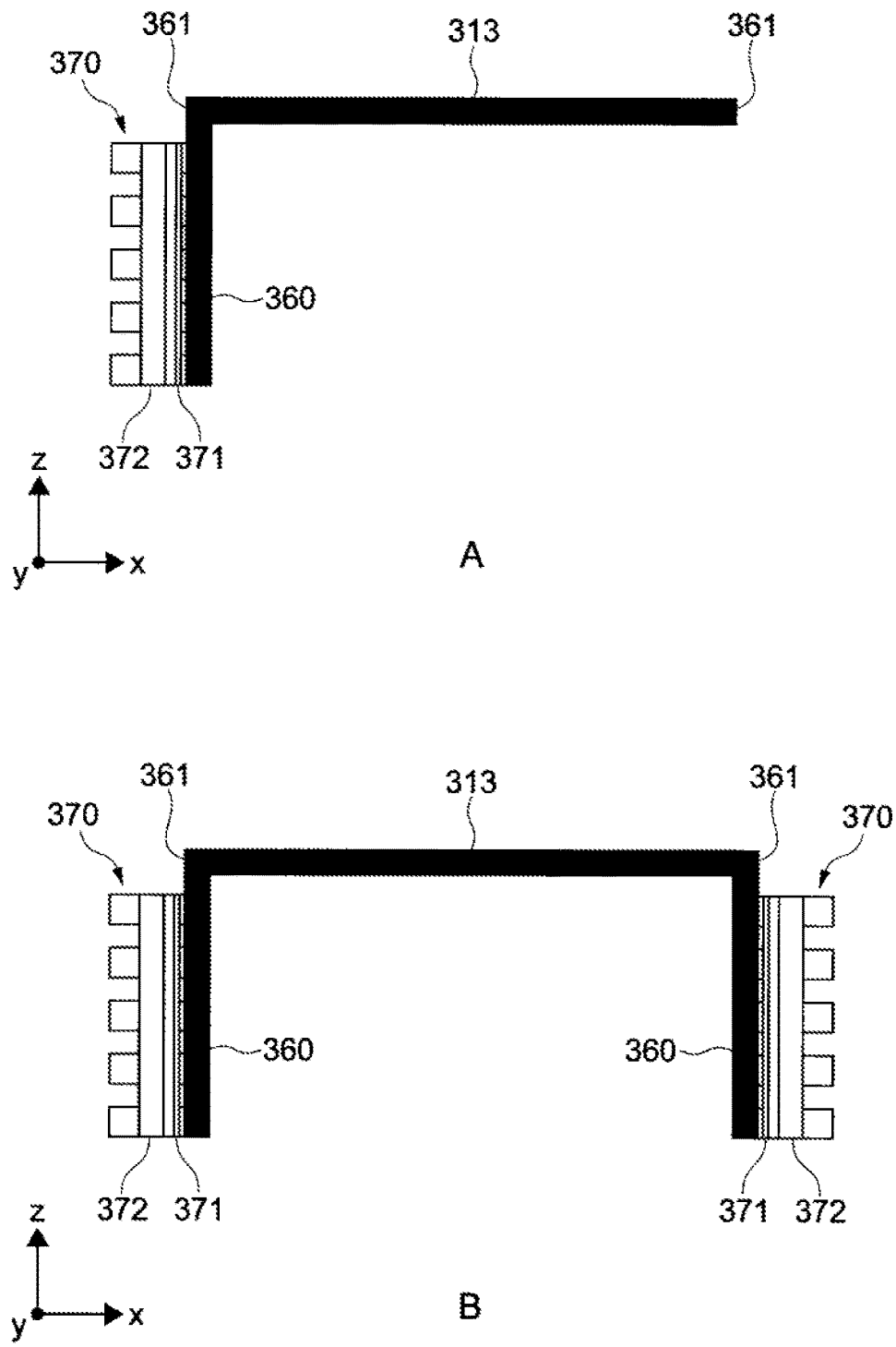
FIG. 16 A schematic diagram showing examples of other embodiments with a cooling section.
Figure 17:
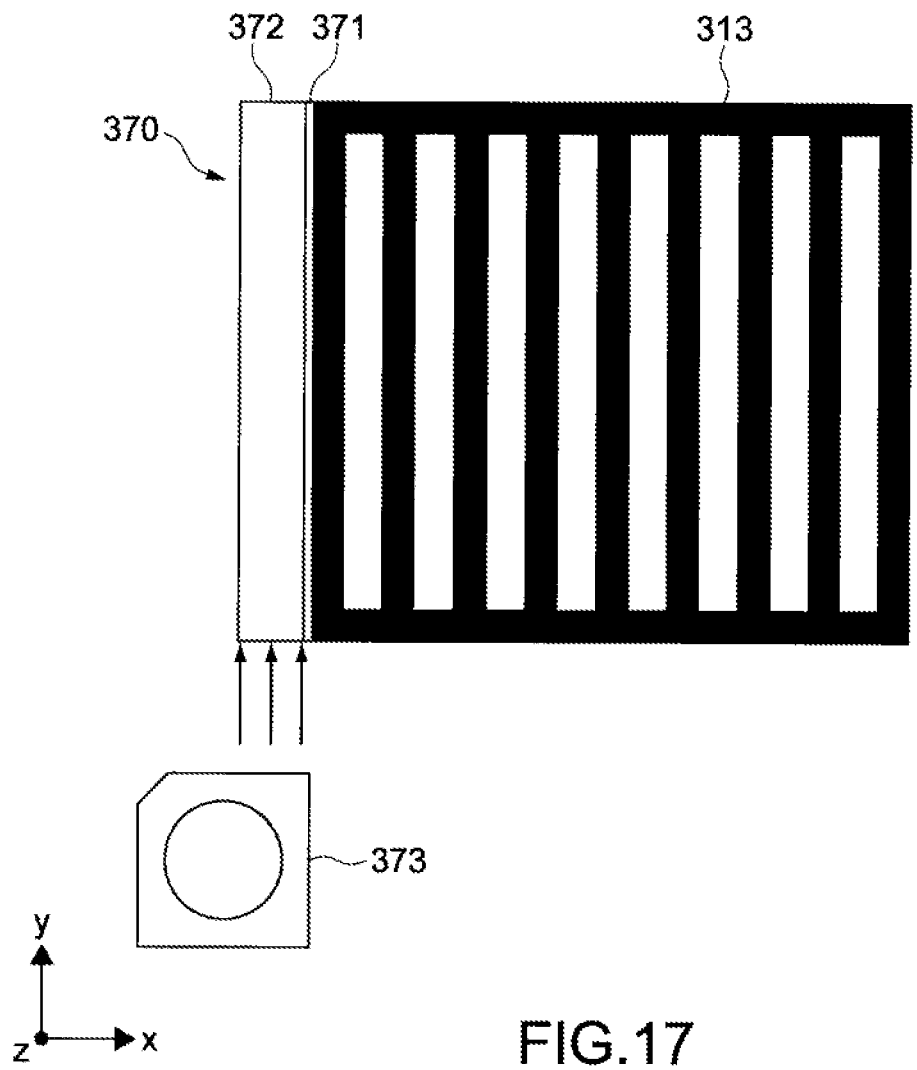
FIG. 17 A schematic diagram showing an example of the other embodiments with the cooling section.

FIGS. 16 and 17 are schematic diagrams showing examples of other embodiments. In FIG. 16, a part of the light shielding plate 313 is extended and an extending portion 360 is formed. This extending portion 360 is provided with a cooling section 370 that cools a light shielding plate 313. In FIG. 16A, in one of two sides 361 of the light shielding plate 313, which are opposed to each other in the row direction (x-direction), the extending portion 360 is formed bending in the optical axis direction (z-direction). A Peltier device 371 and a heat sink 372 are in a close contact with the extending portion 360 in the stated order as the cooling section 370. In FIG. 16B, the extending portion 360 is formed in both the two sides 361 and extending portions 360 are both provided with the Peltier device 371 and the heat sink 372. Due to the provision of the cooling section 370, heat generated in the light shielding plate 313 can be dissipated also in the case of using a high-output laser. Thus, influences on the shape and accuracy of the mechanical and optical components around the light shielding plate 313 can be reduced.

The shape, position, and the like of the extending portion 360 are not limited and any configuration may be employed. As shown in FIG. 16, it may be provided bending in an L letter shape or the like or the extending portion 360 may be provided along a plane direction of the light shielding plate 313. Any configuration can be employed as long as the configuration enables the light shielding plate 313 and the cooling section 370 to be thermally connected with each other. Note that, in the case where the entire illumination optical system is configured to have a hermetically sealed structure for preventing the luminance from being lowered due to dust adhesion, it is conceivable that the light shielding plate 313 is fixed at a predetermined position in an inserting manner. In this case, the configuration as shown in FIG. 16 is effective.

Also for the cooling section, any configuration can be used. Any can be used as the Peltier device 371 and the heat sink 372. One other than those members may be used as the cooling section 370. For example, as shown in FIG. 17, a cooling fan 373 or the like may be included in the cooling section by blowing the air to the Peltier device 371, the heat sink 372, or the like. With this, the cooling function can be improved. Otherwise, liquid-cooling one using a tube or the like may be used as the cooling section 370.

Figure 18:
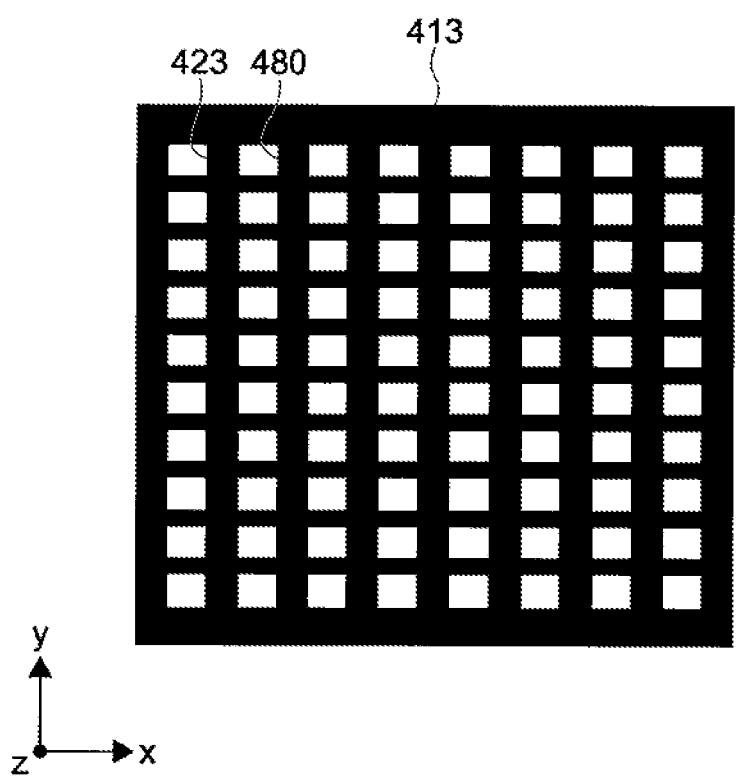
FIG. 18 A schematic diagram showing an example of other embodiments of the light shielding plate.

FIG. 18 is a schematic diagram showing an example of other embodiments of the light shielding plate. In a light shielding plate 413 shown in the figure, the same number of holes 480 as the plurality of lens cells of the second fly eye lens, which respectively correspond to the lens cells, are formed as apertures 423. The light shielding plate 413 is provided such that these holes 480 are opposed to the central regions of the respective lens cells. Due to the formation of such apertures 423, it is possible to increase the light-shielding rate of reflection light and sufficiently shield the reflection light to the light source section.

In the above, the three light source sections are provided for the laser light beams of the RGB colors. It is not limited to this configuration and, for example, a single light source section that emits white laser light may be used. A configuration in which the white laser light is split into the RGB laser light beams and the laser light beams of the respective colors enter three light modulators that modulate red light, green light, and blue light, respectively, may be made.

In the above-mentioned embodiment, the first optical axis of the first optical system and the second optical axis of the second optical system are shifted from each other. However, depending on the configuration of the light shielding plate, the optical axes do not need to be shift.

By applying the present technology to a digital-cinema projector serving as the image display apparatus, it becomes possible to achieve the high luminance and high output and to easily achieve brightness for favorably seeing movies in a large screen. Of course, the present technology can also be applied to a projector that displays 3D images.

At least, two of the features of the above-mentioned embodiments can also be combined.

It should be noted that, the present technology may also take the following configurations.

(1) An image display apparatus, including:
  a light source section including at least one or more laser light sources;
  one or more reflection type light modulators that modulate and reflect incident light;
  an optical system that divides light from the light source section into a plurality of split light beams, superimposes the plurality of split light beams on the one or more reflection type light modulators, and causes them to enter; and
  a light shielding plate that is provided in the optical system, the light shielding plate including
    an aperture provided on a path of each of the plurality of split light beams, and
    a light shielding portion that shields reflection light from the reflection type light modulator to the light source section.

(2) The image display apparatus according to (1), in which the optical system includes
    a first fly eye lens upon which light from the light source section is incident, and
    a second fly eye lens upon which light from the first fly eye lens is incident, and
  the light shielding plate is provided in vicinity of the second fly eye lens.

(3) The image display apparatus according to (2), in which the optical system includes
    a first optical system from the light source section to the second fly eye lens, and
    a second optical system from the second fly eye lens to the reflection type modulator, and
  an optical axis of the first optical system and an optical axis of the second optical system are shifted relative to each other.

(4) The image display apparatus according to (2) or (3), in which
  the second fly eye lens includes a plurality of lens cells that are arranged in a column direction and a row direction, the first fly eye lens forms an image of the light source section on each of the plurality of lens cells of the second fly eye lens, and the aperture has a size depending on a size of the formed image of the light source section.

(5) The image display apparatus according to (4), in which the light shielding plate includes a plurality of strip-shaped apertures each having a predetermined width in the row direction and extending in the column direction, and the light shielding portion arranged between the plurality of apertures, and the plurality of apertures are arranged opposed to central regions of the plurality of lens cells.

(6) The image display apparatus according to (5), in the size of the width of each of the plurality of apertures is a size of 50% or more and 80% or less of a size of the lens cell in the row direction.

(7) The image display apparatus according to (4), in which the aperture is the same number of apertures as the plurality of lens cells arranged opposed to the central regions of the plurality of lens cells.

(8) The image display apparatus according to (5), in the light shielding plate is provided on a side of the reflection type light modulator of the second fly eye lens, and the image display apparatus further includes a polarization conversion element that is provided between the second fly eye lens and the light shielding plate and separates each of the plurality of split light beams into two, converts a polarization direction of one separated light beam, shifts either one of the separated light beam obtained by converting the polarization direction and the other separated light beam in the column direction, and emits them, the optical axis of the first optical system and the optical axis of the second optical system being shifted relative to each other in the column direction and the row direction.

(9) The image display apparatus according to any one of (1) to (8), further including a cooling section that cools the light shielding plate,

(10) The image display apparatus according to any one of (1) to (9), in which the light shielding plate is formed of a material having a high thermal conductivity.

(11) The image display apparatus according to any one of (1) to (10), in which the light shielding plate is formed of a black surface-treated material.

(12) The image display apparatus according to any one of (1) to (11), in which the one or more reflection type light modulators include three reflection type light modulators that modulate red light, green light, and blue light, respectively, and the optical system and the light shielding plate are provided in each of the three reflection type modulators for each of the color light beams.

(13) An image display method, including:

emitting light by a light source section including at least one or more laser light sources;

splitting light from the light source section into a plurality of split light beams and superimposing the plurality of split light beams on a reflection type light modulator;

shielding, by a light shielding plate including an aperture provided on a path of each of the plurality of split light beams, reflection light from the reflection type light modulator to the light source section while transmitting a plurality of split light beams traveling to the reflection type light modulator through the aperture; and modulating and reflecting the plurality of superimposed split light beams by the reflection type light modulator to thereby display an image.

DESCRIPTION OF SYMBOLS

L laser light
L1 (L2) split light beam
L3 reflection light
O1 first optical axis
O2 second optical axis
2 reflection type light modulator
10 illumination optical system
11 light source section
12 integrator optical system
13 light shielding plate
14 laser light source
16 first fly eye lens
18 second fly eye lens
23 aperture
24 light shielding portion
27 first optical system
28 second optical system
100 image display apparatus

The invention claimed is:

1. An image display apparatus, comprising:

at least one laser light source;

a light modulator configured to modulate light from the at least one laser light source;

a first optical system configured to divide the light from the at least one laser light source into a plurality of split light beams, wherein the first optical system includes a light shielding plate, the light shielding plate including an aperture provided on an initial path of each of the plurality of split light beams, and a light shield provided around the aperture; and a second optical system configured to direct the plurality of split light beams from the first optical system to the light modulator, wherein the light shield is configured to shield the at least one laser light source from the plurality of split light beams reflected from the light modulator, and at least one of the plurality of split light beams is enlarged as the at least one of the plurality of split light beams passes through the aperture.

2. The image display apparatus according to claim 1, wherein the first optical system includes a first fly eye lens upon which the light from the at least one laser light source is incident, and a second fly eye lens upon which the light from the first fly eye lens is incident, and the light shielding plate is provided on the light modulator side of the second fly eye lens.

3. The image display apparatus according to claim 2, wherein the light modulator is a liquid-crystal device.

4. The image display apparatus according to claim 1, wherein the first optical system further comprises:

a polarization converter configured to convert polarization of at least a part of the plurality of split light beams, wherein the polarization converter is provided on the light modulator side of a second fly eye lens.

5. The image display apparatus according to claim 1, wherein the light shielding plate includes a plurality of the aperture, wherein the plurality of the aperture is aligned in a predetermined direction, and a center axis of the light shielding plate corresponds to an optical axis of the first optical system, wherein the center axis is centered between edges of one of the aperture in the predetermined direction.

6. The image display apparatus according to claim 1, wherein a second fly eye lens and the aperture are placed with a space therebetween.

7. The image display apparatus according to claim 1, wherein the light that enters the first optical system is shifted in a width direction of the aperture.

8. The image display apparatus according to claim 1, wherein an optical axis of the light that enters the first optical system is shifted before the light passes through the light shielding plate.

9. An image display apparatus, comprising;
at least one laser light source;
a light modulator configured to modulate light from the at least one laser light source:
a first optical system configured to divide the light from the at least one laser light source into a plurality of split light beams, wherein the first optical system includes a light shielding plate, the light shielding plate including an aperture provided on an initial path of each of the plurality of split light beams, and a light shield provided around the aperture: and
a second optical system configured to direct the plurality of split light beams from the first optical system to the light modulator, wherein
the light shield is configured to shield the at least one laser light source from the plurality of split light beams reflected from the light modulator,
the first optical system further includes a polarization converter configured to convert polarization of at least a part of the plurality of split light beams,
the polarization converter is provided on the light modulator side of a second fly eye lens,
an optical axis of the light that is incident on the polarization converter corresponds to the optical axis of the light that enters the first optical system, and
an optical axis of the light that is emitted from the polarization converter corresponds to the optical axis of the light that is shifted before the light passes through the shielding plate.

10. An image display apparatus, comprising:
at least one laser light source:
a light modulator configured to modulate light from the at least one laser light source:
a first optical system configured to divide the light from the at least one laser light source into a plurality of split light beams, wherein the first optical system includes a light shielding plate, the light shielding plate including an aperture provided on an initial path of each of the plurality of split light beams, and a light shield provided around the aperture; and
a second optical system configured to direct the plurality of split light beams from the first optical system to the light modulator, wherein
the light shield is configured to shield the at least one laser light source from the plurality of split light beams reflected from the light modulator,
the light shielding plate includes a plurality of the aperture,
the plurality of the aperture is aligned in a predetermined direction,
a center axis of the light shielding plate corresponds to an optical axis of the first optical system, wherein the center axis is centered between edges of one of the aperture in the predetermined direction, and
a shift amount of the optical axis of the light that enters the first optical system before the light passes through the light shielding plate is substantially half of a distance between the plurality of the aperture.

11. The image display apparatus according to claim 10, wherein the shift amount is substantially ¼ of a long-axis lens size of at least one lens array of second fly eye lens.

* * * * *